US009538364B2

(12) United States Patent
Sarkhel et al.

(10) Patent No.: US 9,538,364 B2
(45) Date of Patent: Jan. 3, 2017

(54) METHOD AND SYSTEM FOR SIM SELECTION

(71) Applicant: Samsung Electronics Co., Ltd., Suwon-si, Gyeonggi-do (KR)

(72) Inventors: Ritesh Sarkhel, West Bengal (IN); Mohit Goyal, Punjab (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/857,124

(22) Filed: Sep. 17, 2015

(65) Prior Publication Data

US 2016/0080933 A1    Mar. 17, 2016

(30) Foreign Application Priority Data

Sep. 17, 2014    (IN) .......................... 2673/DEL/2014

(51) Int. Cl.
| | |
|---|---|
| *H04B 1/10* | (2006.01) |
| *H04W 8/18* | (2009.01) |
| *H04M 1/725* | (2006.01) |
| *H04M 3/42* | (2006.01) |
| *H04M 1/02* | (2006.01) |

(52) U.S. Cl.
CPC ......... *H04W 8/183* (2013.01); *H04M 1/72569* (2013.01); *H04M 3/42093* (2013.01); *H04M 1/0281* (2013.01)

(58) Field of Classification Search
CPC ...... H04W 4/008; H04W 24/08; H04W 24/10; H04W 4/02; H04W 12/02; H04W 12/08; H04W 24/02; H04W 36/0055; H04W 36/0061; H04W 36/0088

USPC ........................ 455/556.1, 69, 552, 317, 558
See application file for complete search history.

(56) References Cited

U.S. PATENT DOCUMENTS

| | | | |
|---|---|---|---|
| 2007/0009125 A1* | 1/2007 | Frerking | ............... H04M 1/605 381/315 |
| 2008/0220825 A1 | 9/2008 | Wu | |
| 2009/0215491 A1* | 8/2009 | Hou | ................... G06K 19/0701 455/558 |
| 2010/0020998 A1 | 1/2010 | Brown et al. | |
| 2013/0279724 A1 | 10/2013 | Stafford et al. | |
| 2015/0358979 A1* | 12/2015 | Puranik | ................ H04B 1/3838 455/452.2 |

FOREIGN PATENT DOCUMENTS

KR    10-2011-0036464 A    4/2011

OTHER PUBLICATIONS

Cha; Earphones know left from right even when you don't; CNET; Tech Culture; http://www.cnet.com/news/earphones-know-left-from-right-even-when-you-dont/; Feb. 1, 2012.

* cited by examiner

*Primary Examiner* — Tu X Nguyen
(74) *Attorney, Agent, or Firm* — Jefferson IP Law, LLP

(57) ABSTRACT

A method and electronic device for subscriber identification module (SIM) selection are provided. The method includes determining an ear, from among a user's ears, corresponding to at least one sensor signal, and selecting a SIM, from among a plurality of SIMs, corresponding to the determined ear.

19 Claims, 22 Drawing Sheets

METHOD AND SYSTEM FOR SIM SELECTION

CROSS-REFERENCE TO RELATED APPLICATION(S)

This application claims the benefit under 35 U.S.C. §119 (a) of an Indian patent application filed on Sep. 17, 2014 in the Indian Intellectual Property Office and assigned Serial number 2673/DEL/2014, the entire disclosure of which is hereby incorporated by reference.

TECHNICAL FIELD

The present disclosure relates to multiple subscriber identification modules (SIMs) in an electronic device. More particularly, the present disclosure relates to a method and system for automatic selection of SIM for radio communication.

BACKGROUND

Dual subscriber identification module (SIM) technology allows users of electronic devices to be served by two carrier network providers. The usage of dual SIM provides the users with several advantages. The user needs to carry only one electronic device including, for example, a SIM-1 and a SIM-2. The user can make use of the dual SIM to take advantage of different carriers provided by the two carrier network providers. For example, the user can select a SIM-1 for mobile data communication and a SIM-2 for communication purposes. In another example, the user can use the SIM-1 for personal contacts and the SIM-2 for office contacts.

Although useful and convenient, the dual SIM technology has several challenges. Current electronic devices allows the user to enable and disable the SIMs, but do not allow the users to switch between the SIMs present in the electronic device. For example, if network signal strength of the SIM-1 goes down during a call and the call is disconnected, the user must perform manual operations to select the SIM-2 to initiate the call again from the SIM-2. This is time consuming and degrades the user experience when the user must perform similar operations multiple times for different contacts. Similarly, when initiating an outgoing call, the user needs to select the desired SIM to initiate the radio communication.

With the development of technology, the electronic devices support multiple SIMs. As the number of SIMs supported by the electronic devices increases, there remains a need for a mechanism which allows users to automatically select and switch among the desired SIMs in an easy manner without degrading the user experience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for automatically selecting a subscriber identification module (SIM) from among a plurality of SIMs for a radio communication in an electronic device.

Another aspect of the present disclosure is to provide a method and system for associating each ear with a SIM from among a plurality of SIMs.

Another aspect of the present disclosure is to provide a method and system for automatically selecting a SIM from among a plurality of SIMs for a radio communication based on a motion of the electronic device.

Another aspect of the present disclosure is to provide a method and system for automatically dialing a last dialed identifier based on a motion of the electronic device.

Another aspect of the present disclosure is to provide a method and system for automatically selecting a SIM from among a plurality of SIMs for a radio communication based on an ear in proximity to the electronic device.

Another aspect of the present disclosure is to provide a method and system for automatically selecting a SIM from among a plurality of SIMs for a radio communication based on an ear-hand pair.

Another aspect of the present disclosure is to provide a method and system for automatically switching a SIM from among a plurality of SIMs for a radio communication based on an ear in proximity to the electronic device.

Another aspect of the present disclosure is to provide a method and system for automatically switching a SIM from among a plurality of SIMs for a radio communication based on an ear-hand pair.

In accordance with an aspect of the present disclosure, a method for radio communication using an electronic device including a plurality of SIMs is provided. The method includes determining an ear corresponding to at least one sensor signal received from at least one sensor unit, and automatically selecting, from the plurality of SIMs, a SIM corresponding to the determined ear for the radio communication.

In accordance with another aspect of the present disclosure, a method for radio communication using an electronic device including a plurality of SIMs is provided. The method includes detecting a movement of the electronic device based on a sensor signal received from at least one sensor unit when an event occurs, and automatically selecting, from the plurality of SIMs, a SIM corresponding to the determined movement for the radio communication.

In accordance with another aspect of the present disclosure, a method for radio communication using an electronic device including a plurality of SIMs is provided. The method includes detecting a movement of the electronic device using at least one sensor unit when an event occurs, determining a direction of the movement of the electronic device based on a sensor signal from the at least one sensor unit and determining an ear corresponding to the direction of the movement, and automatically selecting, from the plurality of SIMs, a SIM corresponding to the determined ear for the radio communication.

Accordingly the various embodiments herein provide a method for radio communication using an electronic device including a plurality of SIMs. The method includes determining an ear-hand pair corresponding to at least one sensor signal received from at least one sensor unit and automatically selecting, from a plurality of SIMs, a SIM corresponding to the determined ear-hand pair for the radio communication.

In accordance with another aspect of the present disclosure, an electronic device for radio communication is provided. The electronic device includes a plurality of SIMs associated with the electronic device and a controller unit configured to determine an ear corresponding to at least one sensor signal received from at least one sensor unit and automatically select, from the plurality of SIMs, a SIM corresponding to the determined ear for the radio communication.

In accordance with another aspect of the present disclosure, an electronic device for radio communication is provided. The electronic device includes a plurality of SIMs associated with the electronic device and a controller unit configured to detect a movement of the electronic device based on a sensor signal received from at least one sensor unit when an event occurs and automatically select, from the plurality of SIMs, a SIM corresponding to the movement for the radio communication.

In accordance with another aspect of the present disclosure, an electronic device for radio communication is provided. The electronic device includes a plurality of SIMs associated with the electronic device and a controller unit configured to detect a movement of the electronic device using at least one sensor unit when an event occurs. The electronic device is configured to determine a direction of the movement of the electronic device based on a sensor signal from at the least one sensor unit and determine an ear corresponding to the direction of the movement, wherein the ear is one of a right ear and a left ear. The electronic device is configured to automatically select, from the plurality of SIMs, a SIM corresponding to the determined ear for the radio communication.

In accordance with another aspect of the present disclosure, an electronic device for radio communication is provided. The electronic device includes a plurality of SIMs associated with the electronic device and a controller unit configured to determine a ear-hand pair corresponding to at least one sensor signal received from at least one sensor unit and automatically select, from a plurality of SIMs, a SIM corresponding to the determined ear-hand pair for the radio communication.

In accordance with another aspect of the present disclosure, a computer program product comprising a computer executable program code recorded on a computer readable non-transitory storage medium is provided. The computer executable program code when executed causes the product to determine an ear corresponding to at least one sensor signal received from at least one sensor unit and automatically select, from a plurality of SIMs, a SIM corresponding to the determined ear for radio communication.

In accordance with another aspect of the present disclosure, a computer program product comprising a computer executable program code recorded on a computer readable non-transitory storage medium is provided. The computer executable program code when executed causes the product to detect a movement of an electronic device based on a sensor signal received from at least one sensor unit when an event occurs and automatically select, from a plurality of SIMs, a SIM corresponding to the determined movement for radio communication.

In accordance with another aspect of the present disclosure, a computer program product comprising a computer executable program code recorded on a computer readable non-transitory storage medium is provided. The computer executable program code when executed causes the product to detect a movement of an electronic device using at least one sensor unit when an event occurs. The computer executable program code when executed causes the product to determine a direction of the movement of the electronic device based on a sensor signal from the at least one sensor unit and determine an ear corresponding to the direction of the movement. The computer executable program code when executed causes the product to automatically select, from a plurality of SIMs, a SIM corresponding to the determined ear for radio communication.

In accordance with another aspect of the present disclosure, a computer program product comprising a computer executable program code recorded on a computer readable non-transitory storage medium is provided. The computer executable program code when executed causes the product to determine an ear-hand pair corresponding to at least one sensor signal received from at least one sensor unit and automatically select, from a plurality of SIMs, a SIM corresponding to the determined ear-hand pair for radio communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
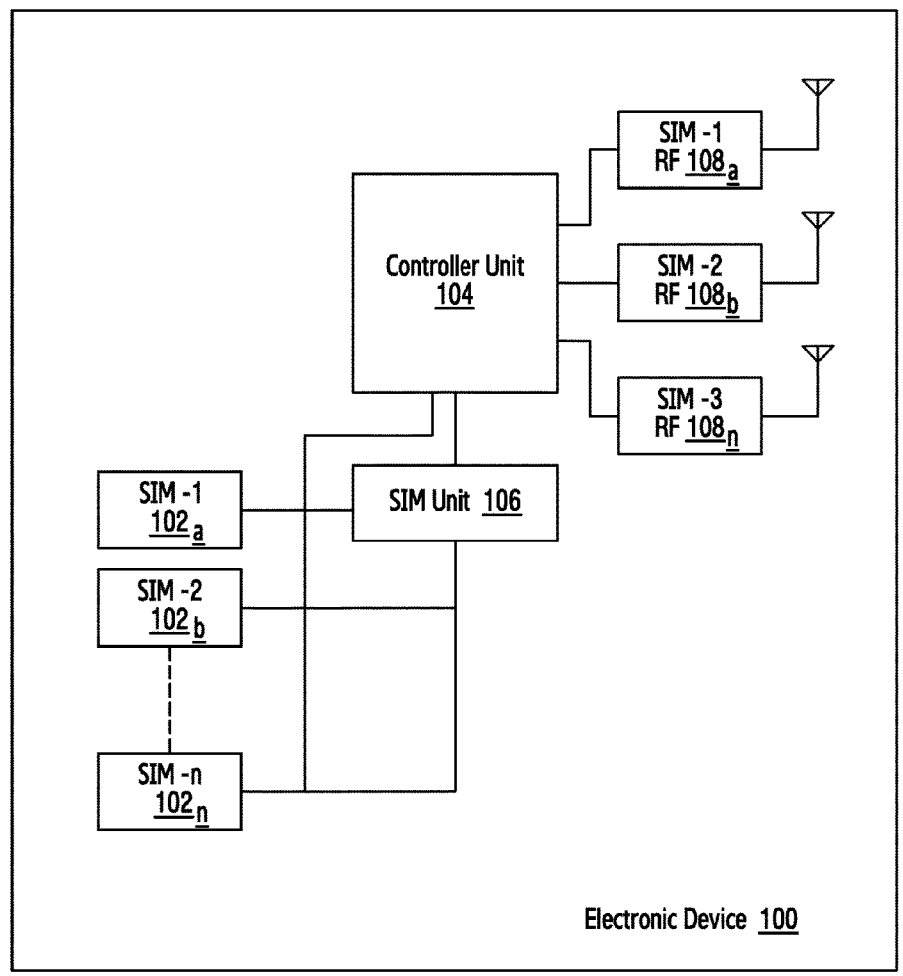
FIGS. 1A and 1B are block diagrams illustrating an electronic device including a plurality of subscriber identification modules (SIMs) according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein provide a system and method for selecting a subscriber identification module (SIM) for radio communication using an electronic device including a plurality of SIMs. The method includes determining an ear corresponding to at least one sensor signal received from at least one sensor unit. The method includes automatically selecting, from the plurality of SIMs, a SIM corresponding to the determined ear for the radio communication.

In an embodiment, a system and method for selecting a SIM from among a plurality of SIMs for radio communication based on a motion of an electronic device is provided. The method includes detecting a movement of the electronic device using at least one sensor unit when a call drop event occurs. The method includes determining a direction of the movement of the electronic device based on a sensor signal from the at least one sensor unit and determining an ear corresponding to the direction of the movement. The method includes automatically selecting, from the plurality of SIMs, a SIM corresponding to the determined ear for the radio communication.

In an embodiment, a system and method for selecting a SIM from among a plurality of SIMs for radio communication based on an ear-hand pair is described. The method includes determining an ear-hand pair corresponding to at least one sensor signal received from at least one sensor unit and automatically selecting, from the plurality of SIMs, a SIM corresponding to the determined ear-hand pair for the radio communication.

Throughout the description the terms "SIM", "SIM card", and "SIM device" are used interchangeably.

Referring now to the drawings, and more particularly to FIGS. 1 through 15, where similar reference characters denote corresponding features consistently throughout the figures, there are shown various embodiments.

Figure 1B:
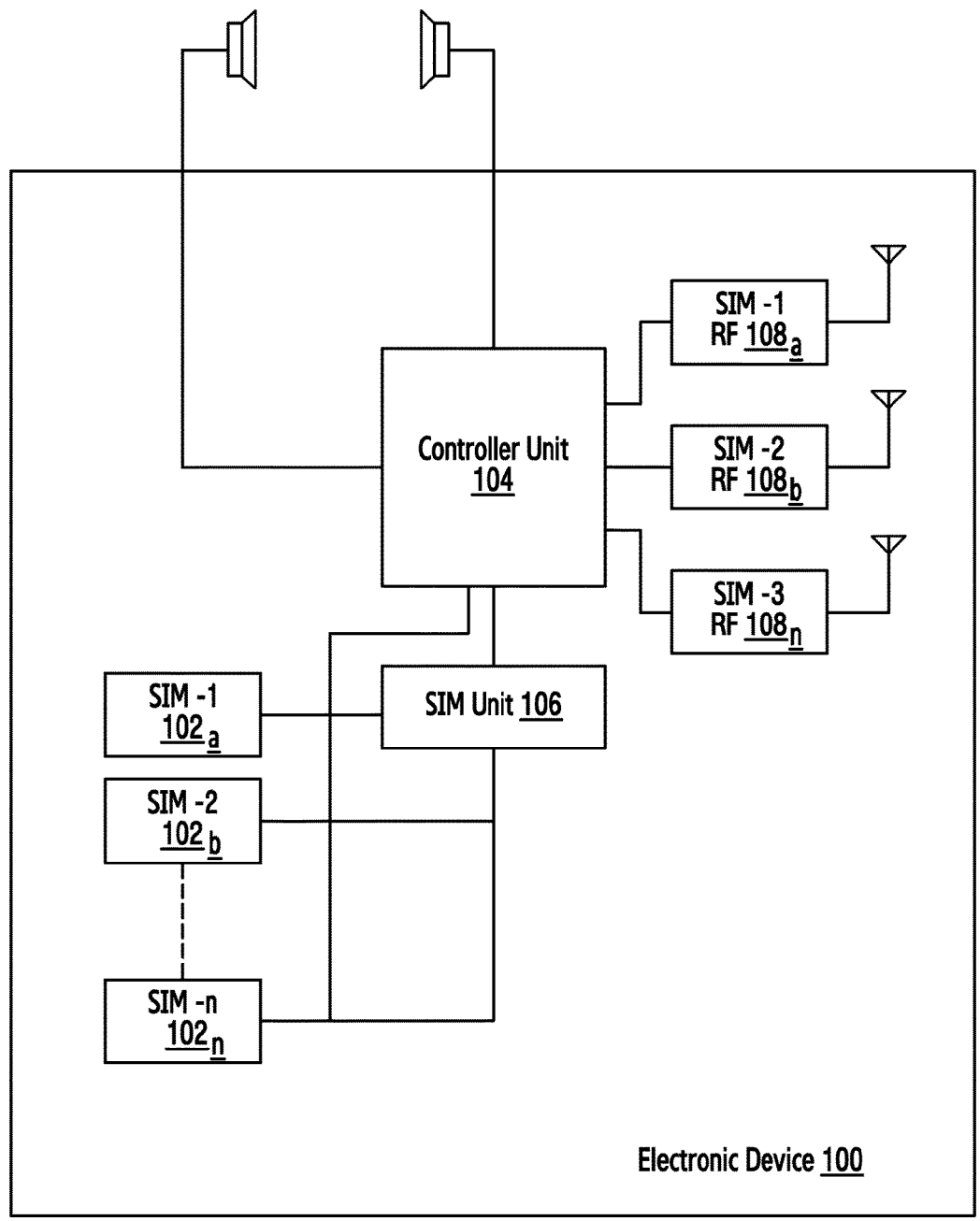

FIGS. 1A and 1B are block diagrams illustrating an electronic device including a plurality of SIMs according to various embodiments of the present disclosure. In an embodiment, the electronic device 100 described herein can be, but is not limited, a cell phone, a personal digital assistant, a mobile personal computer, a laptop, a tablet, a phablet, a desktop computer, a communicator, or an equivalent thereof.

Referring to FIGS. 1A and 1B, a SIM 102a-102n is either a removable smart card or is emulated within the electronic device along with required information to identify the electronic device. The electronic device 100 can be designed to accommodate multiple SIMs.

Referring to FIG. 1A the electronic device 100 includes multiple SIMs (102a, 102b . . . 102n), a controller unit 104, and a SIM unit 106. The controller unit 104 can be configured to select a SIM 102a-102n using the SIM unit 106. Each SIM 102 has its own radio frequency (RF) transceiver (108a, 108b . . . 108n). The SIM unit 106 can be configured to automatically select and switch between the available SIMs in the electronic device 100.

FIG. 1B illustrates a pair of ear pieces worn by a user (not shown) connected to the electronic device 100 containing multiple SIMs (102a, 102b . . . 102n). In an embodiment, radio communication is established by the electronic device 100 by associating an ear (i.e., a left ear or aright ear) with a SIM 102 available in the electronic device 100. A plurality of sensor units on the ear piece or the electronic device 100 can be configured to send sensor signals to the controller unit 104, such as to identify an ear piece or ear to establish the radio communication. Based on the received sensor signal, the controller unit 104 can be configured to automatically select a SIM 102 for the radio communication. Examples of radio communication established using the electronic device 100, can include, but are not limited to, a voice call signal, a video call signal, or various types of data according to text or multimedia message transmission. Details of the operations performed for the SIM selection are explained below in conjunction with the FIG. 5.

For example, when a user of the electronic device wants to initiate a call, the user may insert the ear piece in the left ear. On receiving the sensor signal, the controller 108 can determine the left ear and select a corresponding SIM 102 for establishing the radio communication. Details of the various types of sensors are given in the FIG. 2.

FIGS. 1A and 1B show a limited overview of the electronic device 100, but it is to be understood that embodiments are not limited thereto. Further, the electronic device 100 can communicate with internal or external network elements for establishing the radio communication using the selected SIM along with other hardware or software components to communicate with each other. For example, the component can be, but is not limited to, a process running in the controller or processor, an object, an executable process, a thread of execution, a program, or a computer. By way of illustration, both an application running on a device and the device itself can be a component.

FIG. 1B expands the modules of the electronic device 100 used for automatically selecting a SIM according to various embodiments of the present disclosure. In an embodiment, the electronic device 100 can be configured to include the controller unit 104, the SIM unit 106, a display unit 202, a sensor unit 206, a radio communication unit 208, and a storage unit 204.

Referring to FIG. 1B, the sensor unit 206 can be configured to sense a motion or orientation of the electronic device 100. The sensor unit 206 described herein can include or emulate one or more sensors to detect the motion, orientation, direction, and the like, parameters. Examples of sensor unit 206 can include for example, but are not limited to, an accelerometer, a gyroscope, a compass, a shock sensor, a tilt sensor, an altimeter, a gravity sensor, a proximity sensor, a touch sensor, and the like, or any combination thereof. The sensor unit 206 can be configured to combine the detected motion and orientation data provided by the accelerometer, gyroscope, and compass for determining the movement of the electronic device 100. The movement or orientation information is passed to the electronic device 100 in the form of one or more sensor signals, such as to determine the direction of the motion or the proximity of the electronic device 100 to one of a right ear and a left ear.

In an embodiment, the controller unit 104 can be configured to identify the direction of the movement of the electronic device 100 based on the sensor signals received from the sensor unit 206, such as to select a SIM from the plurality of SIMs for radio communication. The determination of direction of the motion of the electronic device 100 and selection of the SIM 102 is explained in more detail below in conjunction with FIG. 8.

In an embodiment, the controller unit 104 can be configured to determine one of the left ear and the right ear in proximity to the electronic device based on the sensor signals received from the sensor unit 206, such as to select a SIM from the plurality of SIMs for radio communication. The various operations performed for determining the ear and corresponding SIM selection are described in detail in conjunction with the FIG. 5.

Further, the controller unit 104 can be configured to select the corresponding SIM from among the plurality of SIMs 102 based on the automatic SIM selection feature configured by the user using the SIM unit 106. The SIM unit 106 is configured to manage the plurality of SIMs 102 of the electronic device 100 and allow the user to configure the desired SIM to at least one ear using the automatic SIM selection feature. The SIMs 102 present on the electronic device 100 are selectively connected to the controller unit 104 using the SIM unit 106. The controller unit 104 can be configured to select a SIM from the plurality of SIMs 102 to be used based on the detection of the ear or the motion.

For example, the SIM-1 102a is configured to be associated with the left ear determination and the SIM-2 102b is configured to be associated with the right ear determination. Based on the signals received from the sensor unit 206, the controller 104 can determine the associated ear (i.e., the left ear or the right ear) and select the SIM corresponding to the determined ear. In case the user moves the electronic device 100 to the left ear when receiving an incoming call, the controller module 102 can be configured to select the SIM-1 102a associated with the left ear.

In another example, if network signal strength of an active SIM-1 102a associated with the left ear goes low and leads to the dropping of a call in progress, the user can move the electronic device 100 or the ear piece connected to the left ear to the right ear for selection of an alternate SIM. The controller unit 104 can be configured to switch to an alternate SIM-2 102b based on the movement of the electronic device or the ear piece to establish the call, using the SIM-2 102b which has better network signal strength.

The radio communication unit 208 can be configured to establish and maintain the radio communication in the electronic device 100 based on the selected SIM. In an embodiment, based on selection of SIM by the controller unit 104, the SIM unit 106 can be configured to connect the selected SIM to the controller unit 104 or the radio communication unit 208 for establishment of the radio communication. The SIM unit 202 can be configured to switch among the plurality of SIMs on the electronic device 100 based on instructions received from the controller 104. A switch present in the electronic device 100 can be used for selecting and switching between the SIMs 102 present in the electronic device 100.

The display unit 202 can be configured to provide a user interface (UI) to configure the automatic SIM selection feature. Additionally, the display unit 202 can be configured to perform sufficient operations to display the various actions related to the radio communication. Further, the details of the automatic SIM configuration and selection features are described below in conjunction with FIGS. 4A and 4B.

The storage unit 204 can be configured to store the automatic SIM selection feature configuration data for selecting the SIM from the plurality of SIMs of the electronic device 100 in accordance to the detected ear or motion.

Figure 2:
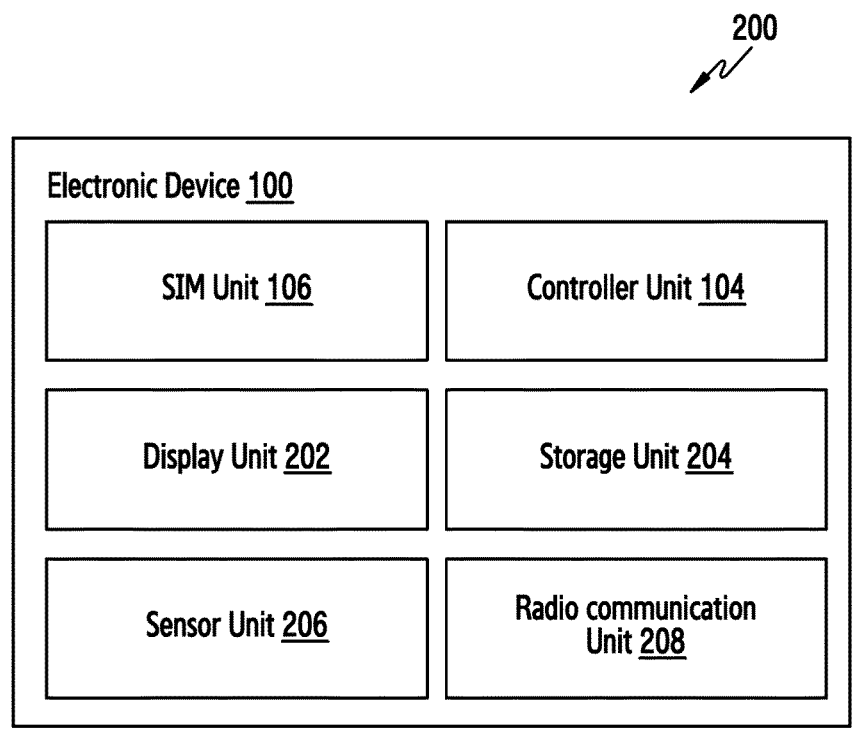
FIG. 2 expands the modules of the electronic device used for automatically selecting a SIM according to various embodiments of the present disclosure.

FIG. 2 illustrates a limited overview of components of the electronic device 100 but, it is to be understood that embodiments are not limited thereto. Further, the electronic device 100 can include any number of module communications locally or remotely with one or more components for automatically selecting the SIM based on at least one of a motion, an ear, and an ear-hand pair along with other hardware or software components to communicate with each other. For example, the component can be, but is not limited to, a process running in the controller or processor, an object, an executable process, a thread of execution, a program, or a computer. By way of illustration, both an application running on a device and the device itself can be a component.

Figure 3:
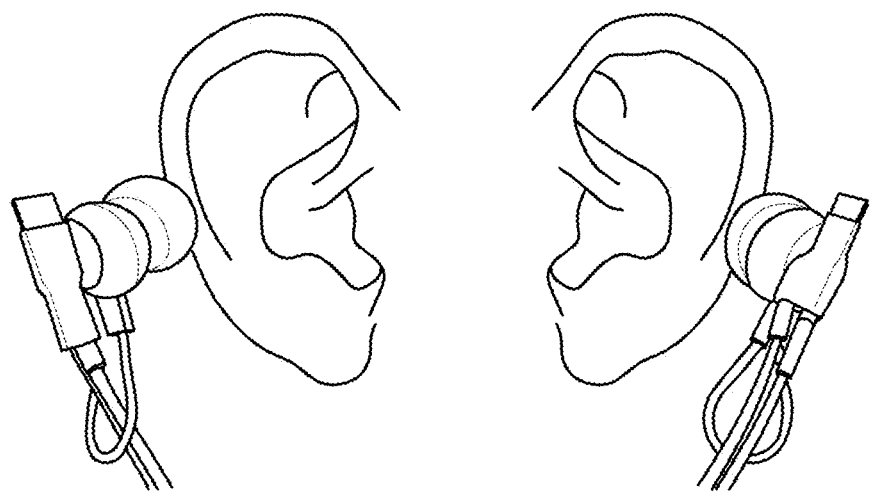
FIG. 3 illustrates an example illustration of ear piece being connected to a left ear and a right ear according to various embodiments of the present disclosure.

FIG. 3 illustrates an example illustration of ear pieces being connected to a left ear and a right ear according to various embodiments of the present disclosure.

Referring to FIG. 3, the ear piece is plugged in through the audio jack of the electronic device 100. Based on the sensor signals received from the sensor unit 206, the controller unit 104 can be configured to determine the ear corresponding to the sensor signal received. Each ear of the user can be associated with a SIM present in the electronic device. In an embodiment, the determination of ear associated with the ear piece can be done either by the controller unit 104 or the sensor unit 206.

In an embodiment, the sensor unit 206 can be located on the ear piece and the electronic device 100 can be configured to send sensor signals to determine the ear in which the ear piece is placed. Based on the determined ear, the controller unit 104 establishes the radio communication session using the selected SIM corresponding to the determined ear.

In an embodiment, based on the identification of the ear (i.e., the left ear or the right ear), and irrespective of the right ear piece or left ear piece, the controller unit 104 can be configured to select the corresponding SIM 102 based on the automatic SIM selection feature configured by the user.

Figure 4A:
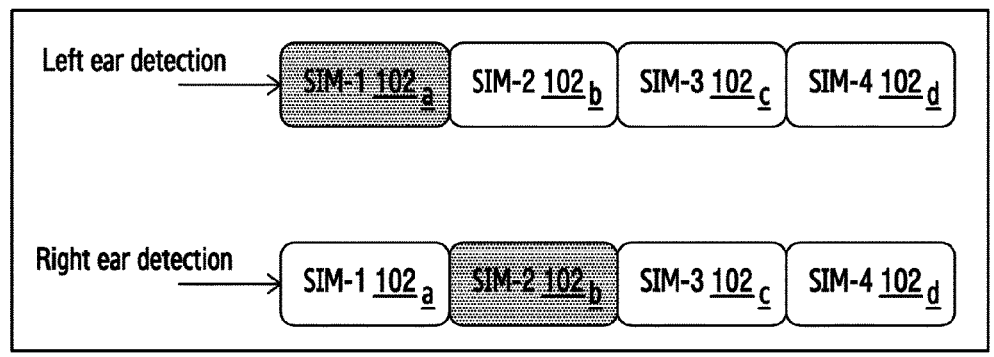
FIGS. 4A and 4B are example illustrations of automatic SIM selection feature configuration for automatic selection of SIM according to various embodiments of the present disclosure.
Figure 4B:
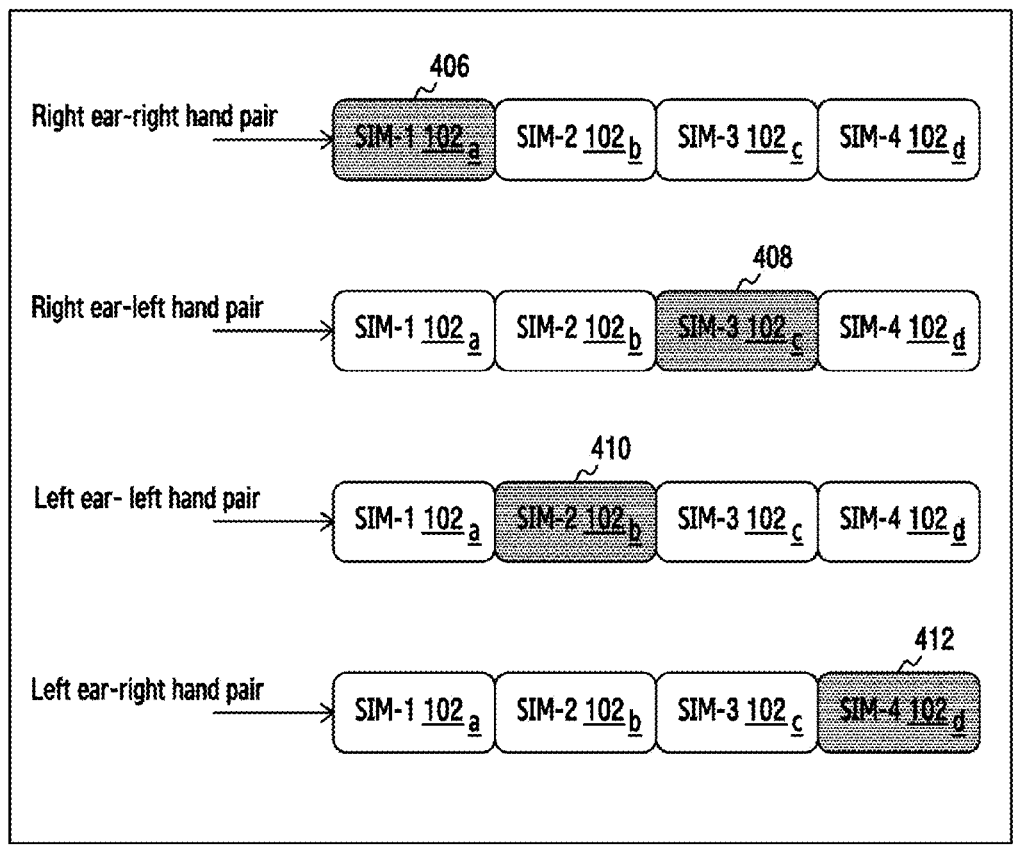

FIGS. 4A and 4B are example illustrations of automatic SIM selection feature configuration for automatic selection of a SIM 102 according to an embodiment of the present disclosure.

Example Automatic SIM Selection Feature Configuration for Dual SIM

Referring to FIG. 4A, a pairing of an ear and the SIM can be used for enabling the automatic SIM selection feature configuration. In an embodiment, based on determination of the ear with an ear piece, a configuration of an ear-SIM pair can be set. The controller module 104 can be configured to detect an ear and an active SIM to form the ear-SIM pair. The SIM unit 206 can be configured to provide the UI for configuring the desired ear-SIM pair by the user. For example, as shown in the FIG. 4A, when the user inserts the left ear piece in the left ear and selects SIM-1 102*a* on the UI of the electronic device 100, the SIM-1 left ear pair configuration is stored in the storage unit 204. Similarly, when the user inserts the right ear piece in the right ear and selects SIM-2 102*b* on the UI of the electronic device 100, the SIM-2 right ear pair configuration is stored in the storage unit 204. In an embodiment, the user can directly perform the desired SIM configuration for the corresponding ear directly from the UI as depicted in the FIGS. 4A and 4B.

The use of the automatic SIM selection feature configuration allows the user to select and switch between the SIMs 102 effortlessly. For example, a left ear may be associated with SIM-1 102*a* and the right ear can be associated with SIM-2 102*b*. When the user wishes to initiate a call from the SIM-1, the user connects the ear piece only to the left ear to select the SIM-1.

Example Automatic SIM Selection Feature Configuration for Multiple SIM

Referring to FIG. 4B, a correlation between a detected ear and a detected hand is used for enabling the automatic SIM selection feature configuration for selecting the SIMs 102 present in the electronic device 100. The controller unit 104 can be configured to detect an ear-hand pair for selecting the corresponding SIM for establishing the radio communication.

For example, when the user holds the electronic device in proximity to the right ear using the right hand and selects the SIM-1 102*a* on the UI of the electronic device 100, a right ear-right hand pair configuration 406 corresponding to SIM-1 is stored in the storage unit 204. Similarly, when the user holds the electronic device 100 in proximity to the right ear using the left hand and selects SIM-3 102*c* on the UI, a right ear-left hand pair configuration 408 corresponding to the SIM-3 is stored in the storage unit 204. Similarly, when the user holds the electronic device 100 in proximity to the left ear using the left hand and selects SIM-2 102*b* on the UI, a left ear-left hand pair configuration 410 corresponding to the SIM-2 is stored in the storage unit 204. Similarly, when the user holds the electronic device 100 in proximity to the left ear using the right hand and selects SIM-4 102*d* on the UI, a left ear-right hand pair configuration 412 corresponding to the SIM-4 is stored in the storage unit 204.

It is to be understood that the ear-SIM paring and the ear-hand pairing corresponding to a SIM described with respect to the FIGS. 4A and 4B is only for illustrative purpose and does not limit the scope of the disclosure. The user can use the proposed system and method to configure any number SIMs based using same or similar modifications of the pairs without departing from the scope of the disclosure.

Figure 5:
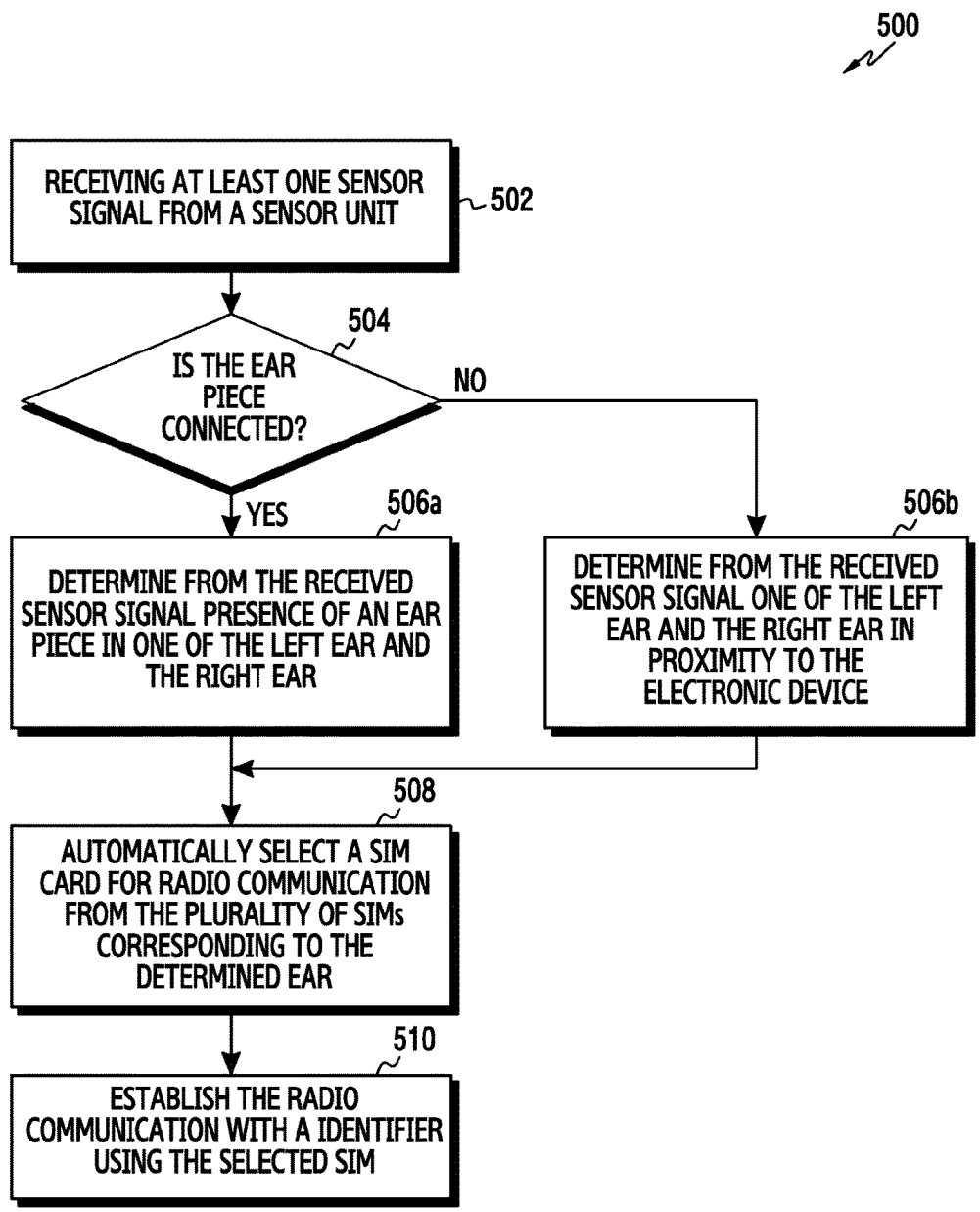
FIG. 5 is a flowchart illustrating a method for automatically selecting a SIM from among a plurality of SIMs based on an ear in proximity to an electronic device according to various embodiments of the present disclosure.

FIG. 5 is a flowchart illustrating a method for automatically selecting a SIM 102 from among a plurality of SIMs 102 based on an ear in proximity to an electronic device 100 according to various embodiments of the present disclosure.

Referring to FIG. 5, the various operations of the method 500 are summarized into individual blocks where some of the operations are performed by the electronic device 100, the user of the electronic device 100, and a combination thereof. The method 500 and other description described herein provide a basis for a control program, which can be implemented using a microcontroller, a microprocessor, or an equivalent thereof.

In an embodiment, at operation 502, the method 500 includes receiving at least one sensor signal from the sensor unit 206. The sensor unit 206 can be configured to sense and send the sensor signals to the controller unit 104.

At operation 504, the method 500 includes determining whether an ear piece is connected with the electronic device 100. Based on the sensor signals, the method 500 allows the controller unit 104 to identity whether the ear piece is connected to the electronic device 100.

At operation 506*a*, the method 500 includes determining the presence of an ear piece in one of the left ear and the right ear based on the sensor signal in response to detecting that the ear piece is connected to the electronic device 100. When the ear piece is connected to the ear, the method 500 allows the controller unit 104 to determine the presence of the ear piece in one of the left ear and the right ear.

At operation 506*b*, the method 500 includes determining one of the left ear and the right ear in proximity to the electronic device 100 from the received sensor signal in response to determining that the ear piece is not connected to the electronic device 100. Based on the sensor signals received from the sensor unit 206 present on the electronic device 100, the method 500 allows the controller unit 104 to determine one of the left ear and the right ear.

At operation 508, the method 500 includes automatically selecting a SIM from the plurality of SIMs 102 for the radio communication corresponding to the determined ear. For example, based on the automatic SIM selection configuration stored in the storage unit 204, the controller unit 104 can be configured to select SIM-1 102*a* when the left ear is detected. Similarly, the controller unit 104 can be configured to select SIM-2 102*b* when the right ear is detected.

At operation 510, the method 500 includes establishing the radio communication with an identifier using the selected SIM. In an embodiment, the method 500 allows the radio communication unit 208 to automatically place an outgoing call to establish the radio communication with an identifier using the selected SIM 102. Examples of identifiers can include, but are not limited to, last dialed numbers, a contact number stored in the phone or SIM, a voice over internet protocol (VoIP) calling identification (ID), and the like. In an embodiment, the method 500 allows the radio communication unit 208 to automatically answer an incoming call to establish the radio communication using the selected SIM.

In an embodiment, the selected SIM can be used to establish the radio communication as per user preferences.

In an example of an email radio communication, the user of the electronic device 100 may prefer using SIM-2 102b as that carrier network provider provides better rates for data communication. The SIM-2 102b may be associated with the left ear. After composing the email, the user can connect the ear piece to one of the left ear or the right ear. Based on the received sensor signal and the determination of the left ear, and the automatic SIM selection feature configured for the electronic device 100, the controller unit 104 can select the SIM-2 for sending the email.

The various actions, acts, blocks, operations, and the like in method 500 may be performed in the order presented, in a different order, or simultaneously. Further, in various embodiments, some actions, acts, blocks, operations, and the like may be omitted, added, modified, skipped, and the like, without departing from the scope of the disclosure.

Figure 6:
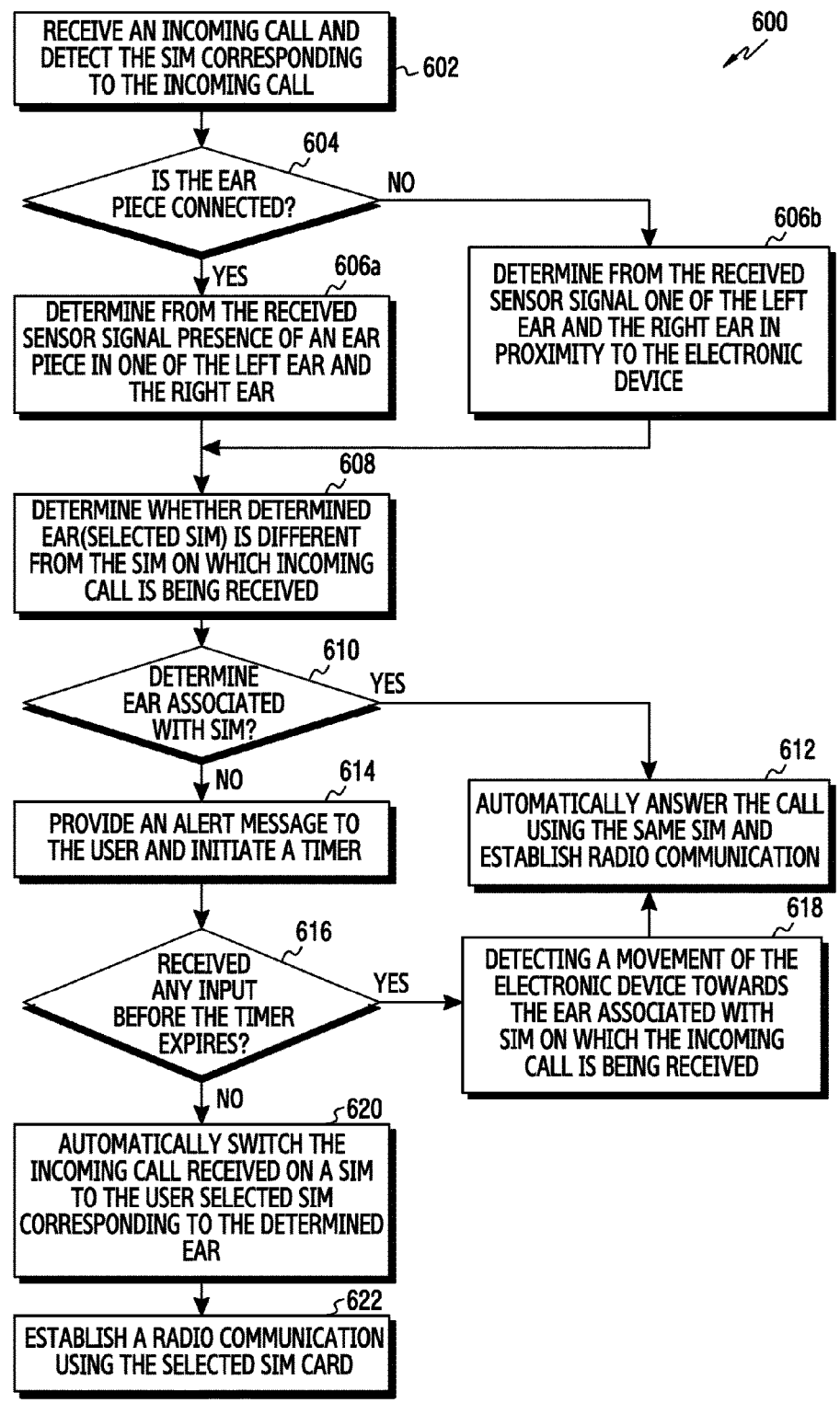
FIG. 6 is a flowchart illustrating an example method for automatically selecting a SIM from among a plurality of SIMs to answer an incoming call based on an ear in proximity to an electronic device according to various embodiments of the present disclosure.

FIG. 6 is a flowchart illustrating an example method for automatically selecting a SIM from among a plurality of SIMs to answer an incoming call based on an ear in proximity to an electronic device according to various embodiments of the present disclosure.

Referring to FIG. 6, the various operations of the method 600 are summarized into individual blocks where some of the operations are performed by the electronic device 100, the user of the electronic device 100, and a combination thereof. The method 600 and other description described herein provide a basis for a control program, which can be implemented using a microcontroller, a microprocessor, or an equivalent thereof.

In an embodiment, at operation 602, the method 600 includes receiving an incoming call and detecting the SIM 102 corresponding to the incoming call. When the electronic device 100 receives an incoming call on one of the SIMs 102 associated with the electronic device 100, the controller unit 104 can be configured to identify the SIM 102 on which the call is being received.

At operation 604, the method 600 includes determining whether an ear piece is connected with the electronic device 100. Based on the sensor signals, the method 600 allows the controller unit 104 to identify whether the ear piece is connected to the electronic device 100.

At operation 606a, the method 600 includes determining the presence of an ear piece in one of the left ear and the right ear based on the sensor signal in response to detecting that the ear piece is connected to the electronic device 100. When the ear piece is connected to the ear, the method 600 allows the controller unit 104 to determine the presence of the ear piece in one of the left ear and the right ear.

At operation 606b, the method 600 includes determining one of the left ear and the right ear in proximity to the electronic device 100 from the received sensor signal in response to determining that the ear piece is not connected to the electronic device 100. Based on the sensor signals received from the sensor unit 206 present on the electronic device 100, the method 600 allows the controller unit 104 to determine one of the left ear and the right ear.

At operation 608, the method 600 includes determining whether the determined ear (i.e., the selected SIM) is different from the SIM to which incoming call is being received. Based on the automatic SIM selection feature configured for the electronic device 100, the controller unit 104 can determine whether the selected SIM is different from the one on which the call is being received.

In an embodiment, the user can select the SIM using the electronic device 100 or an ear piece connected to the electronic device 100. Based on presence of the ear piece connected to an ear or the proximity of the electronic device to an ear, the controller unit can determine the ear-SIM pair selected by the user.

At operation 610, the method 600 includes determining if the ear is associated with the SIM 102. Based on the ear determined by the controller unit 104 and the detected SIM 102 on which the call is being received, the controller unit 108 can be configured to determine if the selected SIM 102 and the SIM 102 corresponding to the incoming call are different.

At operation 612, the method 600 includes automatically answering the call on the SIM 102 corresponding to the incoming call, when selected SIM 102 by the user and the SIM 102 corresponding to the incoming call is being received are same.

If the determined ear and the incoming call are associated with the same SIM 102, the controller unit 104 can be configured to use the automatic SIM selection feature configured for the electronic device 100 to automatically select the SIM 102 on which the incoming call is being received for radio communication using the automatic SIM selection feature.

For example, when a user is receiving a call on SIM-1 102a associated with left ear, if the user moves the electronic device 100 towards the left ear, the controller unit 104 can recognize the movement of the electronic device 100 and the proximity of the electronic device 100 to the left ear. Based on the received sensor signals and the determination that the left ear is configured for SIM-1 in the automatic SIM selection feature configured for the electronic device 100 and the incoming call is detected on SIM-1 102a, the call is answered by the user and a radio communication is established between a caller and the user (callee) of the electronic device 100.

At operation 614, the method 600 includes providing an alert message to the user and initiating a timer associated with the alert message, when the selected SIM 102 by the user and the SIM 102 corresponding to the incoming call are different.

Example Steps for Selection of Alternate SIM for an Incoming Call

The alert message indicates to the user that a wrong ear has been selected by the user for answering the incoming call. The alert message, can include, but is not limited to, a unique vibration pattern, a pre-defined flashing of screen, and any other feedback signal.

At operation 616, the method 600 includes determining if any input is received before the timer expires. The use of the alert message and the timer provides an opportunity to the user to reselect the SIM.

At operation 618, if an input is received, the method 600 includes detecting a movement of the electronic device 100 towards the ear associated with SIM 102 on which the incoming call is being received. If the movement followed by the electronic device 100 is a curved motion associated with a direction, it can easily be detected that the user is moving the electronic device 100 to the ear corresponding to the SIM 102 on which the incoming call is received. The incoming call is then automatically answered on the SIM 102 corresponding to the incoming call.

At operation 620, if there is no input from the user, the method 600 includes automatically switching the incoming call received on a SIM 102 to the user selected SIM 102 corresponding to the determined ear. The controller unit 104 can be configured to determine that the user wishes to take the call on an alternate SIM 102, when no input is received till the timer expires. In another embodiment, if there is no input from the user, the method 600 includes sending a notification message to the caller. The notification message can request the caller to contact the callee on a number associated with the user based on the automatic SIM selection configuration data.

At operation 622, the method 600 includes establishing a radio communication using the selected SIM. For example, the user has two SIMs 102 in the electronic device 100, and the SIM-1 102a is currently on roaming. To avoid roaming charges, the user may wish to take the incoming call on the SIM-2 102b. If the call is received on a SIM-1 102a (associated with the right ear), and the user selects a SIM-2 102b (associated with the left ear), the controller unit 104 provides an alert message to the user indicating the wrong ear, i.e., indicating that the wrong SIM is being selected by the user. When there is no input from the user in response to the alert within a predefined time period, the controller unit 104 can determine that the user wishes to use the selected SIM-2 102b for receiving the call.

In an embodiment, the incoming call on the SIM 102 is disconnected and a forward indication is sent to the carrier provider network. The forward indication includes the SIM 102 information of the user selected SIM 102. The carrier provider network receives the indication to forward the call to the user in real time. The call is established between the caller and callee using the SIM selected by the user.

In an embodiment, a voice confirmation informing that the alternate SIM is active can be provided to the user before establishing the connection with the user selected SIM.

In an embodiment, a user setting allows the user to configure call forward settings. For example, when roaming, the user may prefer using an alternate SIM to receive calls. The setting may be displayed on the UI while configuring the SIM selection feature.

Unlike methods of the related art, which include the operations of the user disconnecting the call, enabling the alternate SIM, and initiating the radio communication, the present method 600 allows the user to easily select the SIM 102 for receiving the call.

The various actions, acts, blocks, operations, and the like in method 600 may be performed in the order presented, in a different order, or simultaneously. Further, in various embodiments, some actions, acts, blocks, operations, and the like may be omitted, added, modified, skipped, and the like, without departing from the scope of the disclosure.

Figure 7A:
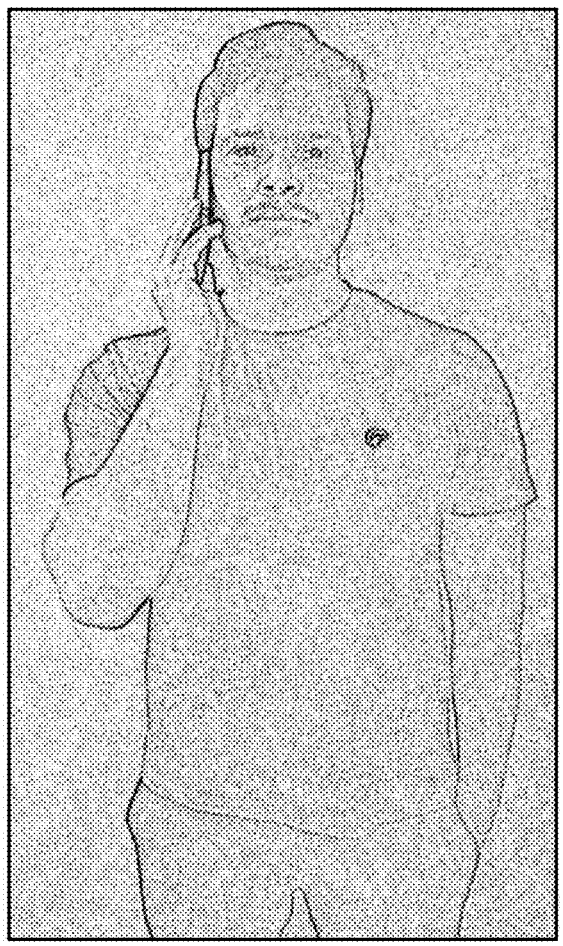
FIGS. 7A and 7B are example illustrations showing a selection of a SIM based on an ear in proximity to an electronic device according to various embodiments of the present disclosure.
Figure 7B:
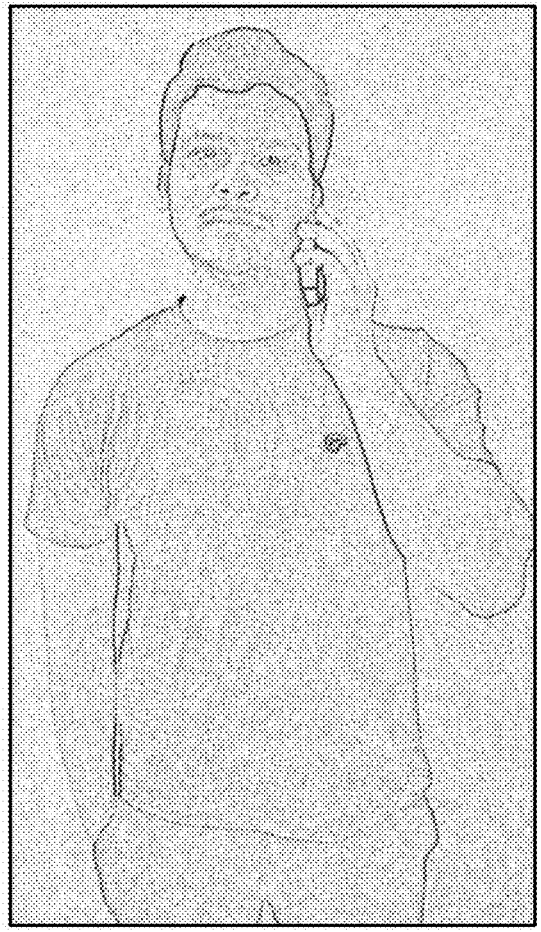

FIGS. 7A and 7B are example illustration of an electronic device associated with an ear according to various embodiments of the present disclosure.

Referring to FIGS. 7A and 7B, when the user of the electronic device 100 brings the electronic device 100 in proximity to the user's right ear (as shown in FIG. 7A), the automatic SIM selection feature configured for the electronic device 100 can identify that the SIM-2 102b is associated with the right ear and the controller unit 104 can identify that the user prefers to communicate using the SIM-2 102b. Accordingly, the controller unit 104 selects the SIM-2 for establishing the radio communication.

Similarly, when the user of the electronic device 100 brings the electronic device 100 in proximity to the user's left ear (as shown in FIG. 7B), the automatic SIM selection feature configured for the electronic device 100 can identify that the SIM-1 102a is associated with the left ear and the controller unit can identify that the user prefers to communicate using the SIM-1 102a. Accordingly, the controller unit 104 selects the SIM-1 for establishing the radio communication.

Figure 8:
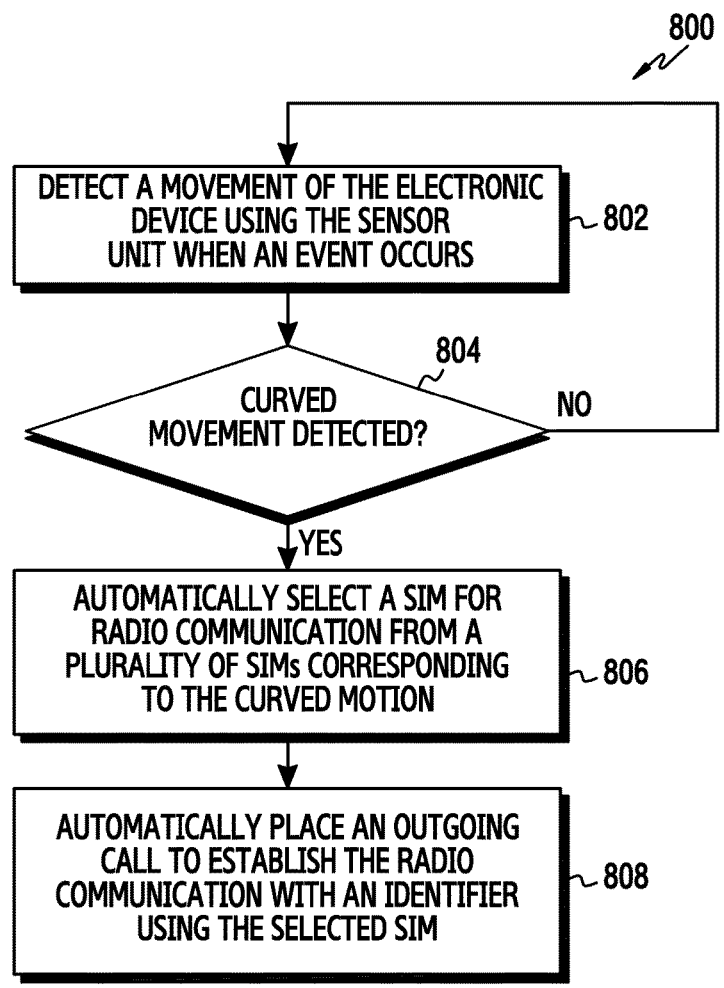
FIG. 8 is a flowchart illustrating a method for automatically selecting a SIM from among a plurality of SIMs based on a movement of an electronic device or ear piece according to various embodiments of the present disclosure.

Detecting the Movement of the Electronic Device/Earpiece from One Ear to Other Ear FIG. 8 is a flowchart illustrating a method for automatically selecting a SIM from among a plurality of SIMs based on a movement of an electronic device or an ear piece according to various embodiments of the present disclosure.

Referring to FIG. 8, the various operations of the method 800 are summarized into individual blocks where some of the operations are performed by the electronic device 100, the user of the electronic device 100, and a combination thereof. The method 800 and other description described herein provide a basis for a control program, which can be implemented using a microcontroller, microprocessor, or an equivalent thereof.

In an embodiment, at operation 802, the method 800 includes detecting a movement of the electronic device 100 using the sensor unit 206 when an event occurs. In an embodiment, the event can be a call in progress which gets disconnected. The reason for disconnection may be, for example, insufficient signal strength received on a caller side or a callee side to maintain an established radio communication, carrier provider network problems (e.g., extreme cell traffic on either one of base stations associated with the caller or the callee), glitches in backend software, power outages, and more.

At operation 804, the method 800 includes determining if a curved motion associated with a direction is detected. The curved motion can be identified by the controller unit 104 based on the sensor signals received from the sensing unit 206. The curved motion detection is done to enable quick selection of an alternate SIM 102 in case of an event. The detection of movement of the electronic device only on the detection of the event ensures that if the user moves the electronic device from one ear from other ear during a communication session, there is no change in the selected SIM.

At operation 806, the method 800 includes automatically selecting a SIM for radio communication from a plurality of SIMs corresponding to the detection of the curved motion of the electronic device 100 or the curved motion of the ear piece. The controller unit selects the SIM 102 for the radio communication using the automatic SIM selection feature configured for the electronic device 100. Based on the direction of the curved movement, the method 800 allows the controller unit 104 to determine the ear towards which the curved motion is performed and the SIM 102 associated with the ear. At operation 808, the method 800 includes automatically placing an outgoing call to establish the radio communication with an identifier using the selected SIM 102. The identifier may be, for example, a last dialed number.

For example, a call in progress gets disconnected due to insufficient credit in the SIM-1 102a. When the call gets disconnected, the user can move the electronic device 100 from one ear (associated with SIM-1 102a) to the other ear (associated with SIM-2 102b) to place a call on the last dialed number using SIM-2 102b. The controller unit 104 can identify the user selected SIM-2 102b based on the curved movement detection.

The various actions, acts, blocks, operations, and the like in method 800 may be performed in the order presented, in a different order, or simultaneously. Further, in various embodiments, some actions, acts, blocks, operations, and the like may be omitted, added, modified, skipped, and the like, without departing from the scope of the disclosure.

Figure 9:
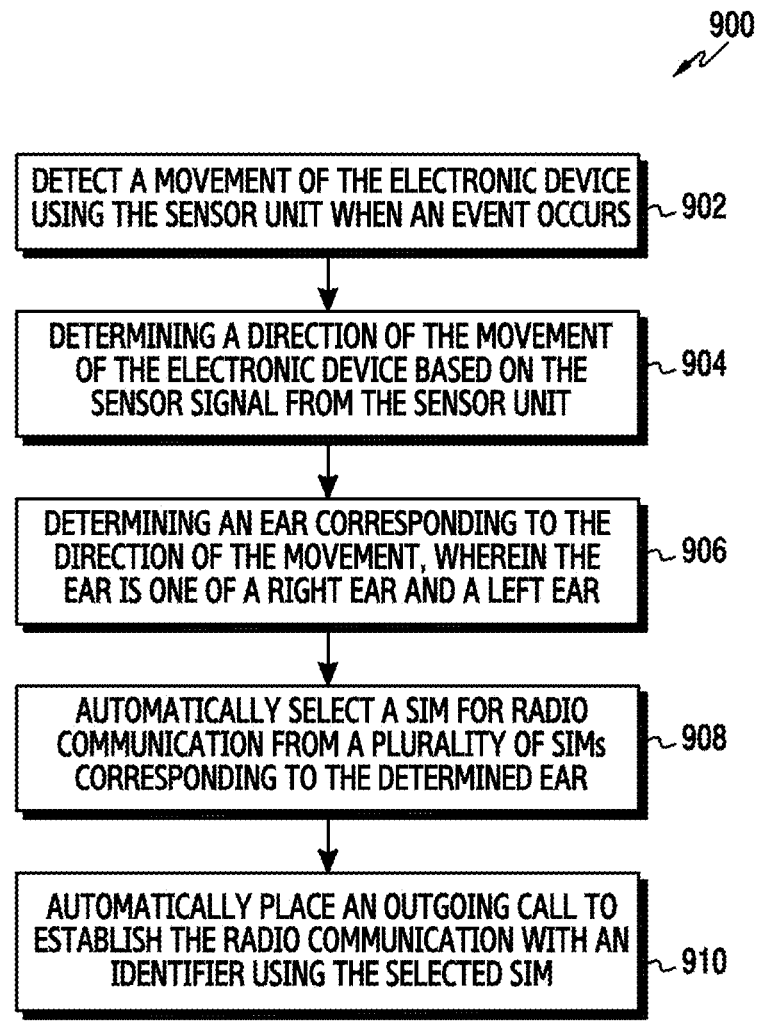
FIG. 9 is a flowchart illustrating a method for automatically selecting a SIM from among a plurality of SIMs based on a movement and ear correlation of an electronic device or ear piece according to various embodiments of the present disclosure.

FIG. 9 is a flowchart illustrating a method for automatically selecting a SIM from among a plurality of SIMs based on a movement and an ear correlation of an electronic device or ear piece according to various embodiments of the present disclosure.

Referring to FIG. 9, the various operations of the method 900 are summarized into individual blocks where some of the operations are performed by the electronic device 100, the user of the electronic device 100, and a combination thereof. The method 900 and other description described herein provide a basis for a control program, which can be implemented using a microcontroller, a microprocessor, or an equivalent thereof.

In an embodiment, at operation 902, the method 900 includes detecting a movement of the electronic device 100 using the sensor unit 206 when an event occurs. The event described herein can be a call drop event.

At operation 904, the method 900 includes determining a direction of the movement of the electronic device 100 based on the sensor signal from the sensor unit 206. The direction of the movement of the electronic device 100 or the ear piece can be monitored using sensor unit 206. The sensor unit 206 for determining the direction of movement can be embedded within the electronic device 100 or the ear piece. Based on the detection the movement pattern can be matched with a predefined movement pattern representing a curved motion.

At operation 906, the method 900 includes determining an ear corresponding to the direction of the curved motion, wherein the ear is one of a right ear and a left ear. The method 900 allows the controller unit 104 to determine the ear corresponding to the curved motion based on the received sensor signals from the sensor unit and previous state provides information of the electronic device 100. The previous state provides information of the electronic device 100 which allows the controller unit 104 to determine the ear selected by the user with accuracy. The previous state information can include the SIM which is currently active, the last dialed number, the loss of connectivity, and the like.

At operation 908, the method 900 includes automatically selecting a SIM for radio communication from the plurality of SIMs corresponding to the determined ear. The method 900 allows the controller unit 104 to select the SIM 102 for the radio communication using the automatic SIM selection feature configured for the electronic device 100. Based on the direction of the curved movement, the controller unit 104 can be configured to determine the ear towards which the curved motion is performed and the SIM 102 associated with the ear. The controller unit 104 dynamically configures the selection of the SIM 102 from the plurality of SIMs 102 corresponding to one of the left ear and the right ear based the direction of the movement.

At operation 910, the method 800 includes automatically placing an outgoing call to establish the radio communication, for example, with the last dialed identifier, using the selected SIM 102. For example, when a call in progress gets disconnected due to insufficient credit in the SIM-1 102a, the user can move the electronic device 100 from one ear (associated with the SIM-1 102a) to the other ear (associated with the SIM-2 102b) to place the call on the last dialed number using the SIM-2 102b. The controller unit 104 can identify the user selected SIM-2 102b based on the curved motion detection.

The various actions, acts, blocks, operations, and the like in method 900 may be performed in the order presented, in a different order, or simultaneously. Further, in various embodiments, some actions, acts, blocks, operations, and the like may be omitted, added, modified, skipped, and the like, without departing from the scope of the disclosure.

Figure 10:
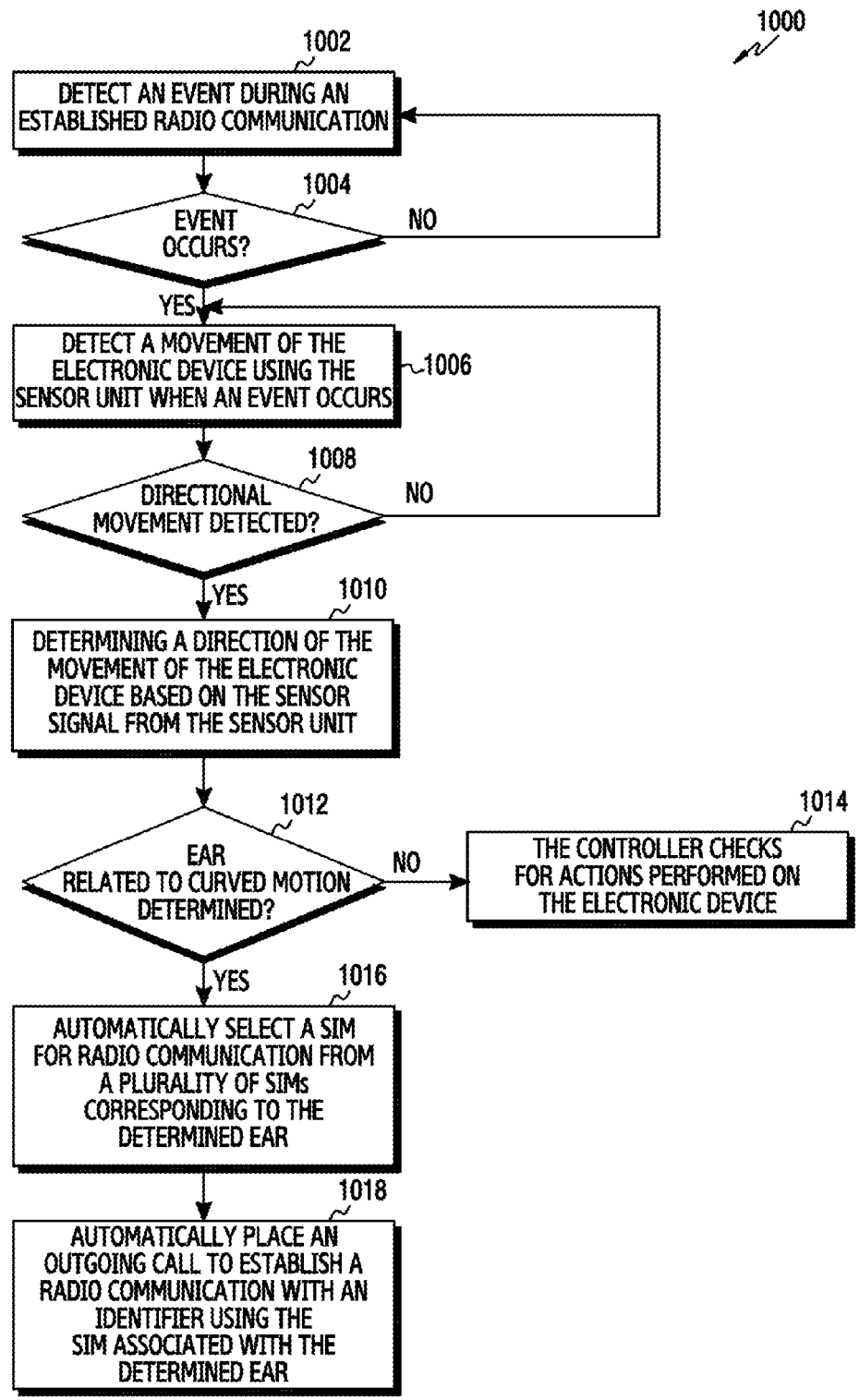
FIG. 10 is a flowchart illustrating a method for detecting movement of an electronic device or ear piece based on detection of an event according to various embodiments of the present disclosure.

FIG. 10 is a flowchart illustrating a method for detecting movement of an electronic device or an ear piece based on the detection of an event according to various embodiments of the present disclosure.

Referring to FIG. 10, the various operations of the method 1000 are summarized into individual blocks where some of the operations are performed by the electronic device 100, the user of the electronic device 100, and a combination thereof. The method 1000 and other description described herein provide a basis for a control program, which can be implemented using a microcontroller, a microprocessor, or an equivalent thereof.

In an embodiment, at operation 1002, the method 1000 includes detecting an event while the electronic device 100 has established a radio communication.

At operation 1004, the method 1000 includes determining if any event occurs. If no event is detected, the method 1000 allows the controller unit 104 to continue monitoring the established radio communication session to detect an event in the electronic device 100.

At operation 1006, the method 1000 includes detecting a movement of the electronic device 100, using the sensor unit 206, when an event occurs.

At operation 1008, the method 1000 includes determining if the movement is directional movement. On detecting the movement of the electronic device 100 after the detection of event, the method 1000 allows the controller unit 104 to determine whether the movement is directional.

At operation 1010, the method 1000 includes determining a direction of the movement of the electronic device 100 based on the sensor signal from the sensor unit 206. The direction of the movement of the electronic device 100 or the ear piece can be monitored using the sensor unit 206.

At operation 1012, the method 1000 includes determining an ear corresponding to the direction of the curved motion, wherein the ear is one of a right ear and a left ear. The method 1000 allows the controller unit 104 to determine the ear corresponding to the curved motion based on the received sensor signals and the previous state of the electronic device 100. The previous state provides information of the electronic device 100, which allows the controller unit 104 to determine the ear selected by the user with accuracy. The previous state information can include the SIM which is currently active, a last dialed number, a loss of connectivity, and the like.

At operation 1014, if an ear related to the curved motion is not determined, the controller unit 104 checks for actions performed on the electronic device 100.

At operation 1016, the method 1000 includes automatically selecting, from a plurality of SIMs, a SIM for radio communication corresponding to the determined ear. The method 1000 allows the controller unit 104 to select the SIM 102 for the radio communication using the automatic SIM selection feature configured for identifying the SIM corresponding to the determined ear. Based on the direction of the curved movement, the controller unit 104 determines the ear and the associated SIM 102.

The controller unit 104 dynamically configures the selection of the SIM 102 from the plurality of SIMs 102 corresponding to one of the left ear and the right ear, based the direction of the movement.

At operation 1018, the method 10000 includes automatically placing an outgoing call to establish the radio communication, for example, with the last dialed identifier, using the selected SIM 102. For example, the user has established a VoIP call using a VoIP messenger application in the electronic device 100, and the radio communication is established using the SIM-1 102*a* associated with the right ear. If the VoIP call gets dropped or disconnected, an event gets detected at the controller unit 1104. The call may get disconnected due to various reasons such as data communication capacity provided by the carrier provider network is exhausted or the channel conditions are poor. If the user moves the electronic device 100, the sensing unit 206 can sends the received sensor signals to the controller unit 104. Based on the movement performed, the controller unit 104 determines whether the movement was a directional curved motion. The controller unit 104 can identify that the user has moved the electronic device 100, for example, from the right ear to the left ear. Further, based on the state of the device and the curved motion, the controller unit 104 can identify that the user wishes initiate the VoIP call using the alternate SIM present in the electronic device 100. A radio communication is established for the VoIP call using the SIM-2 102*b* associated with the left ear.

The various actions, acts, blocks, operations, and the like in method 1000 may be performed in the order presented, in a different order or simultaneously. Further, in various embodiments, some actions, acts, blocks, operations, and the like may be omitted, added, modified, skipped, and the like, without departing from the scope of the disclosure.

Figure 11A:
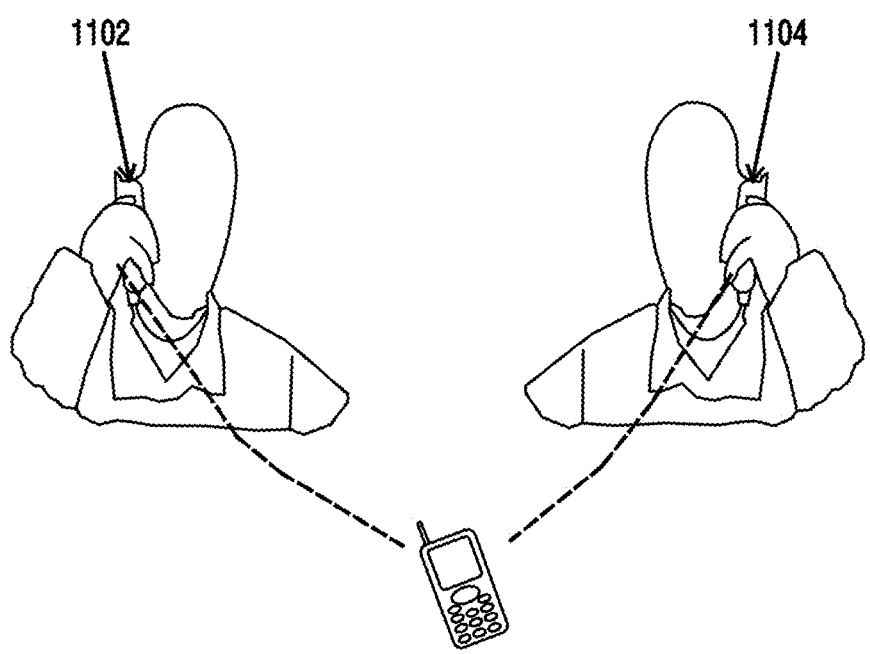
FIGS. 11A and 11B illustrates an example curved motion according to various embodiments of the present disclosure.
Figure 11B:
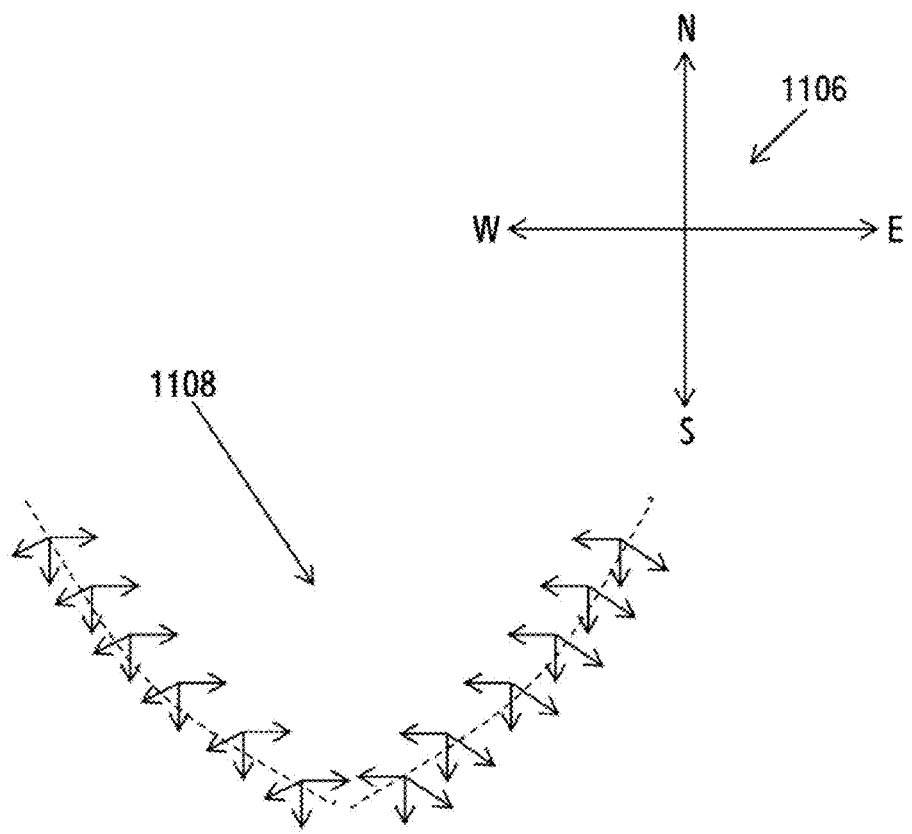

FIGS. 11A and 11B are example illustration of a curved motion according to various embodiments of the present disclosure.

Referring to FIG. 11A, the curved motion of the electronic device 100 includes moving from the user's right ear 1102 to the user's left ear 1104 and vice versa. The right ear 1102 may be associated with a SIM-1 102*a* and the left ear with SIM-2 102*b*. For example, when the user is talking with a friend on a call received through the SIM-1 102*a* and the user is at a remote location (in which the signal strength received by SIM-1 102*a* is low), then there is possibility of the call getting dropped. If the call gets dropped, the user can move the electronic device 100 from the right ear to the left ear to automatically select another SIM and place the call again using the selected SIM.

Referring to FIG. 11B, a compass used for sensing the direction 1106 and the various measurements 1108 taken by the sensor unit 206 to detect the curved motion are depicted. The measurements plotted to form the movement pattern observed when the electronic device include movement after detection of the event. The movement pattern is plotted using multiple sensors such as the accelerometer, the gyroscope, the compass, and the like. The accelerometer is a sensor that measures physical acceleration, usually used for measuring small movements. The gravity defines the Z vector (up/down) and, when combined with the X vector (east/west) and the Y vector (north/south), provides a three dimensional (3D) orientation coordinate system. The gyroscope is a sensor for measuring orientation. A gyroscope measures changes in orientation and changes in rotational velocity (rotation rate). The compass makes use of the Earth's magnetic field to determine absolute orientation in the NESW plane.

Figure 12:
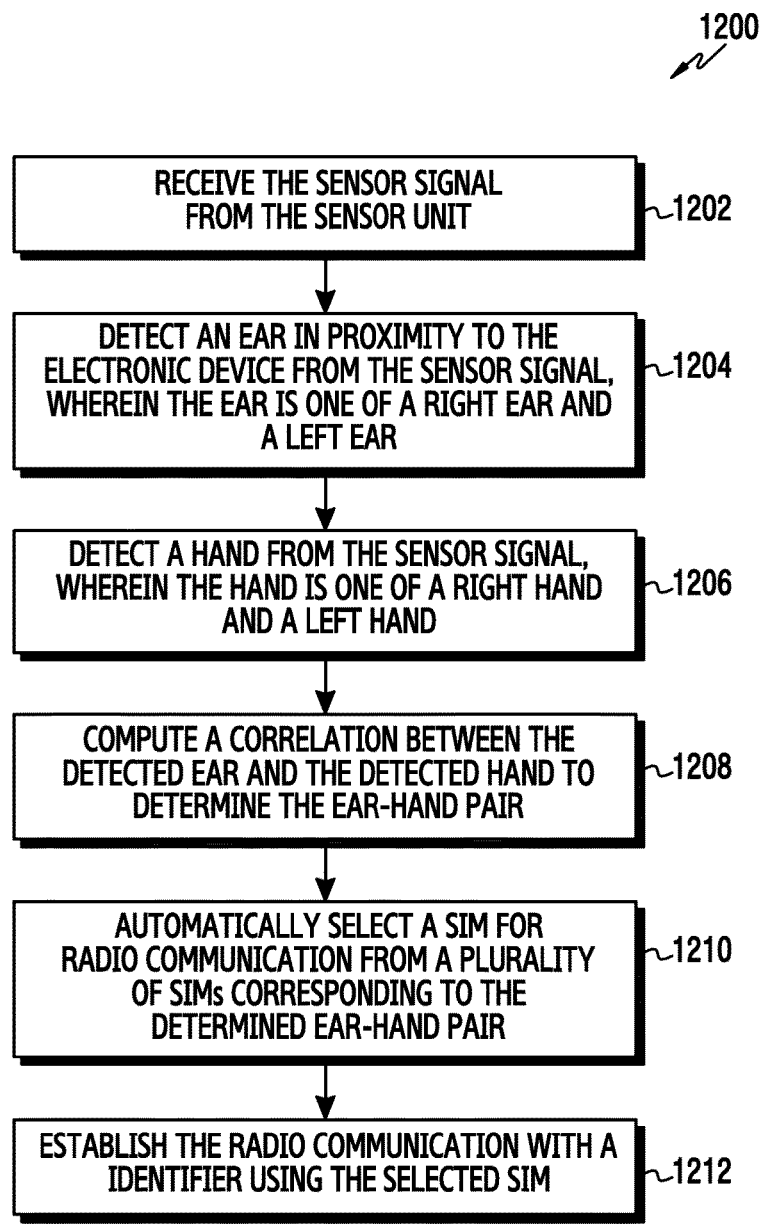
FIG. 12 is a flowchart illustrating a method for automatically selecting a SIM from among a plurality of SIMs based on an ear-hand pair correlation according to various embodiments of the present disclosure.

FIG. 12 is a flowchart illustrating a method for automatically selecting a SIM from among a plurality of SIMs based on an ear-hand pair correlation according to various embodiments of the present disclosure.

Referring to FIG. 12, the various operations of the method 1200 are summarized into individual blocks where some of the operations are performed by the electronic device 100, the user of the electronic device 100, and a combination thereof.

In an embodiment, at operation 1202, the method 1200 includes receiving at least one sensor signal from a sensor unit 206. The sensor unit 206 can be configured to send the sensor signals received from plurality of sensors present on the ear piece or the electronic device 100.

At operation 1204, the method 1200 includes detecting an ear in proximity to the electronic device 100. Based on the sensor signals received from the sensor unit 206, the method 1200 allows the controller unit 104 to determine one of the left ear and the right ear.

At operation 1206, the method 1200 includes detecting a hand. Based on the sensors signals received from the sensing unit 206, the hand holding the electronic device 100 can be determined to be one of a right hand and a left hand.

In an embodiment, a plurality of capacitive sensors at certain locations of the electronic device 100 can be configured to detect the hand holding the electronic device 100. Based on the sensor signals received, the controller unit 104 can be configured to determine the hand holding the electronic device 100. In various embodiments, techniques of the related art for detecting a hand can be utilized by the controller unit 104 to detect the hand.

At operation 1208, the method 1200 includes computing a correlation between the detected ear and the detected hand to determine the ear-hand pair. The correlation of ear-hand can be used for configuring multiple SIMs 102. The various combinations of determined ear and detected hand can be configured (as shown in FIG. 4B) for selection of the multiple SIMs present in the electronic device 100.

SIM-1 102*a* (406) may be selected, for example, when the electronic device 100 is held on the right hand and the electronic device 100 is in proximity to the right ear. The SIM-3 102*c* (408) may be selected when the electronic device 100 is held on the right hand and the electronic device 100 is in proximity to the left ear. The SIM-2 102*b* (410) may be selected when the electronic device 100 is held on the left hand and the electronic device 100 is in proximity to the left ear. The SIM-4 102*d* (412) may be selected when the electronic device 100 is held on the right hand and the electronic device 100 is in proximity to the left ear.

At operation 1210, the method 1200 includes automatically selecting a SIM from the plurality of SIMs 102 for radio communication based on the correlation between the ear-hand pair. The controller unit selects the SIM 102 for the radio communication using the automatic SIM selection feature configured for identifying the SIM corresponding to the determined ear-hand pair. Based on the determined ear-hand pair and corresponding SIM available in the automatic SIM selection feature configured by the user, the SIM for the radio communication is selected.

For example, if the ear-hand pair corresponds to the SIM-3 102*c*, the call is received on SIM-3 102*c*. The electronic device 100 uses the automatic SIM selection feature controlled by the controller unit 104 for establishing the radio communication. The user of the electronic device can enable or disable the automatic SIM selection feature as per preferences.

At operation 1212, the method 1200 includes establishing the radio communication with an identifier using the selected SIM.

In an embodiment, at operation 1210, the method 1200 may include automatically placing an outgoing call to establish the radio communication with an identifier using the selected SIM 102. The identifier can be the last dialed number.

In an embodiment, at operation 1210, the method 1200 includes include automatically answering an incoming call to establish the radio communication using the selected SIM. Examples of identifiers can include, but are not limited to, last dialed numbers, a contact number stored in the phone or SIM, a VoIP calling ID, and the like.

The various actions, acts, blocks, operations, and the like in method 1200 may be performed in the order presented, in a different order, or simultaneously. Further, in various embodiments, some actions, acts, blocks, operations, and the like may be omitted, added, modified, skipped, and the like, without departing from the scope of the disclosure.

Figure 13:
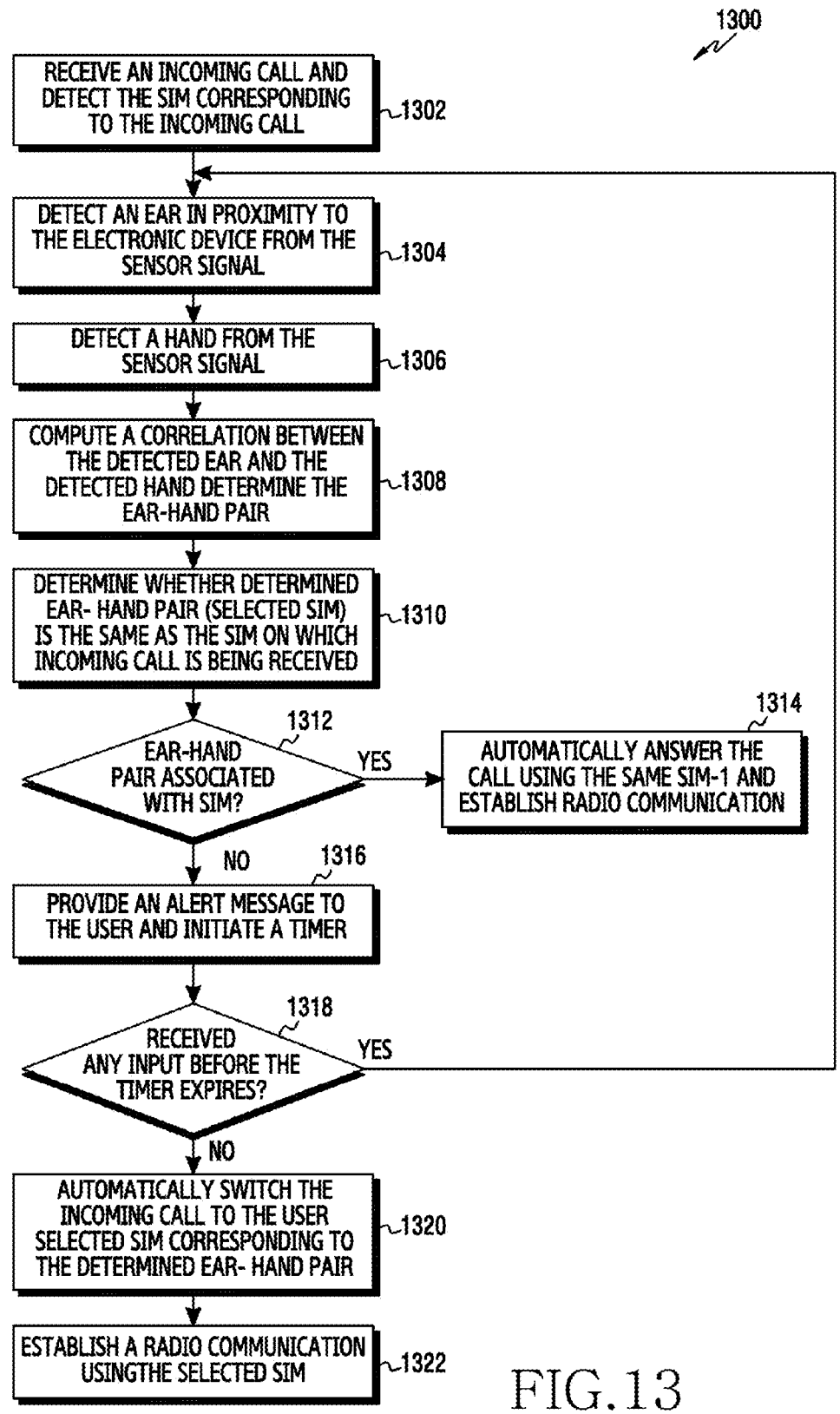
FIG. 13 is a flowchart illustrating an example method for automatically selecting a SIM from among a plurality of SIMs to answer an incoming call based on an ear-hand pair correlation according to various embodiments of the present disclosure.
Figure 14A:
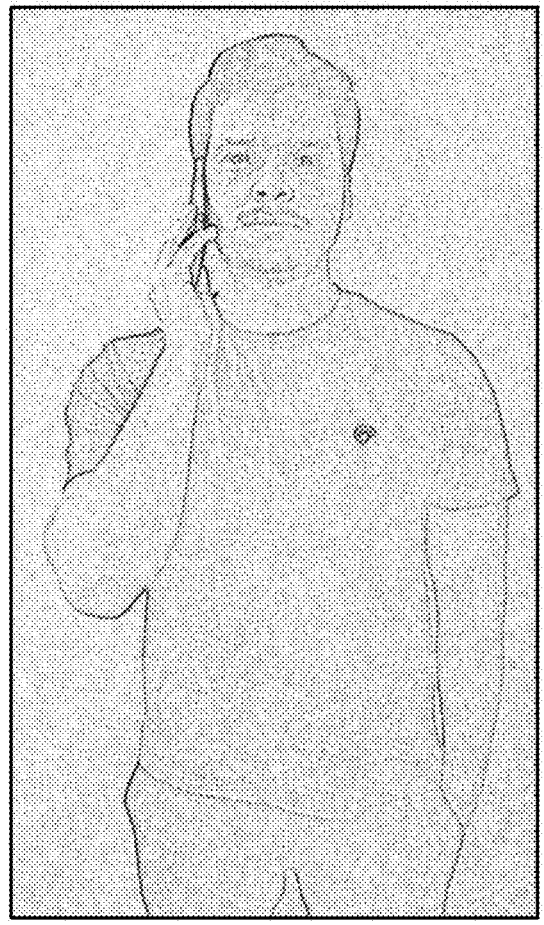
FIGS. 14A, 14B, 14C, and 14D are example illustrations showing a selection of a SIM based on an ear-hand pair according to various embodiments of the present disclosure.
Figure 14B:
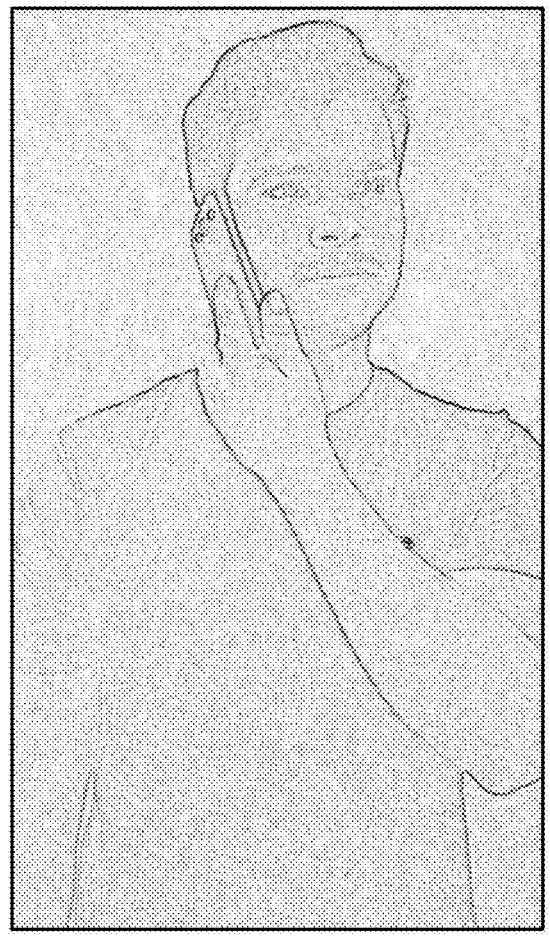
Figure 14C:
Figure 14D:
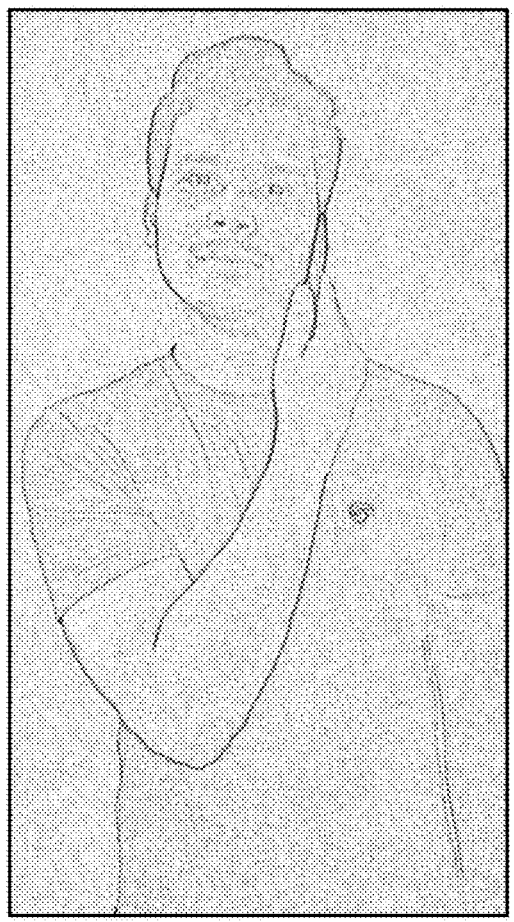

FIG. 13 is a flowchart illustrating an example method for automatically selecting a SIM from among a plurality of SIMs to answer an incoming call based on an ear-hand pair correlation according to various embodiments of the present disclosure.

Referring to FIG. 13, the various operations of the method 1300 are summarized into individual blocks where some of the operations are performed by the electronic device 100, the user of the electronic device 100, and a combination thereof. The method 1300 and other description described herein provide a basis for a control program, which can be implemented using a microcontroller, a microprocessor, or an equivalent thereof.

In an embodiment, at operation 1302, the method 1300 includes receiving an incoming call and detecting the SIM 102 corresponding to the incoming call. When the electronic device 100 receives an incoming call on one of the multiple SIMs 102 associated with the electronic device 100, the controller unit 104 can be configured to identify the SIM 102 on which the call is being received.

At operation 1304, the method 1300 includes detecting an ear in proximity to the electronic device 100. Based on the sensor signals received from the sensor unit 206, the controller unit 104 can be configured to determine one of the left ear and the right ear.

At operation 1306, the method 1300 includes detecting a hand. Based on the sensor signals received from the sensing unit 206, the hand holding the electronic device 100 can be determined.

At operation 1308, the method 1300 includes computing a correlation between the detected ear and the detected hand to determine the ear-hand pair. The correlation of ear-hand can be used for configuring multiple SIMs 102. The various combinations of ear-hand are described in the FIG. 4B.

At operation 1310, the method 1300 includes determining if the determined ear-hand pair is associated with the SIM 102 on which the call is being received. Based on ear-hand pair determined by the controller unit 104 and the detected SIM 102 on which the call is being received, the controller unit 104 can be configured to determine if the selected SIM 102 and the SIM 102 corresponding to the incoming call are different.

At operation 1312, the method 1300 includes automatically answering the call on the SIM corresponding to the incoming call, when the selected SIM 102 by the user and the SIM 102 corresponding to the incoming call are same. If the determined ear-hand pair and the incoming call are associated with the same SIM, the controller unit 104 can be configured to automatically select a SIM 102 for the radio communication from the plurality of SIMs corresponding to the determined ear at operation 1314 using the automatic SIM selection feature.

For example, a user is receiving a call on the SIM-1 102a associated with the left ear-left hand combination. If the electronic device 100 is held by the user on the left hand and in proximity to left ear, the controller unit 104 can identify that the computed ear-hand combination is related (410) to the SIM-2 102b. The call is answered by the user using the SIM-2 102b and a radio communication is established between a caller and the user (callee) of the electronic device 100.

For another example, a user is receiving a call on the SIM-2 102b associated with the left ear-left hand combination. If the user moves the electronic device 100 towards the right ear with the left hand and the controller unit 104 re-computes the correlation between the detected ear-hand, the controller unit 104 can identify that the computed ear-hand combination is related (408) to the SIM-3 102c using the automatic SIM selection feature configured by the user. The call is answered by the user using SIM-3 102c and the radio communication is established between a caller and the user (callee) of the electronic device 100.

At operation 1316, the method 1300 includes providing an alert message to the user and initiating a timer associated with the alert message, when the SIM selected by the user using the determined ear-hand pair and the SIM corresponding to the incoming call are different.

The alert message indicates to the user that a wrong ear-hand combination, i.e., a wrong SIM 102, has been selected by the user for answering the incoming call. The alert message can include, but is not limited to, a unique vibration pattern, a pre-defined flashing of screen, or any other feedback signal.

At operation 1318, the method 1300 includes determining if any input is received before the timer expires. The use of alert message and the timer provides an opportunity to the user to reselect the SIM.

At operation 1318, if an input is received, the method 1300 includes detecting a movement of the electronic device 100 towards the ear associated with SIM 102 on which the incoming call is being received.

At operation 1320, if there is no input from the user, the method 1300 includes automatically switching the incoming call received on a SIM 102 to the user selected SIM 102 corresponding to the computed ear-hand combination. The controller unit 104 can be configured to determine that the user wishes to take the call on another SIM 102, when no input is received before the timer expired.

In an embodiment, at operation 1318, if there is no input from the user, the method 1300 includes sending an SMS to the caller. The SMS can request the caller to contact the callee on a number associated with the user selected SIM.

At operation 1322, the method 1300 includes establishing a radio communication using the selected SIM.

The various actions, acts, blocks, operations, and the like in method 1300 may be performed in the order presented, in a different order, or simultaneously. Further, in various embodiments, some actions, acts, blocks, operations, and the like may be omitted, added, modified, skipped, and the like, without departing from the scope of the disclosure.

FIGS. 14A, 14B, 14C, and 14D are example illustrations of an electronic device associated with an ear-hand pair according to various embodiments of the present disclosure.

Referring to FIGS. 14A to 14D, when the user of the electronic device 100 brings the electronic device 100 in proximity to the user's right ear using the right hand (as shown in the FIG. 14A), the controller units identifies the right ear-right hand pair based on the sensor signals received from the sensor unit 206. The automatic SIM selection feature configured for the electronic device 100 is used to identify that the SIM-1 102a is associated with the right ear-right hand pair. Accordingly, the controller unit 104 selects the SIM-1 102a for establishing the radio communication.

Similarly, when the user of the electronic device 100 brings the electronic device 100 in proximity to the right ear using the left hand (as shown in the FIG. 14B), the controller unit 104 identifies the right ear-left hand pair based on the sensor signals received from the sensor unit 206. The automatic SIM selection feature configured for the electronic device 100 can identify that the SIM-3 102c is associated with the right ear-left hand pair. Accordingly, the controller unit 104 selects the SIM-3 102c for establishing the radio communication.

Similarly, when the user of the electronic device 100 brings the electronic device 100 in proximity to the left ear using the left hand (as shown in the FIG. 14C), the automatic SIM selection feature configured for the electronic device 100 can identify that SIM-2 102b is associated with the left ear and the controller unit 104 can identify that the user prefers to communicate using SIM-2 102b. Accordingly, the controller unit 104 selects the SIM-2 102b for establishing the radio communication.

Similarly, when the user of the electronic device 100 brings the electronic device 100 in proximity of the left ear using the right hand (as shown in the FIG. 14D), the automatic SIM selection feature configured for the electronic device 100 can identify that SIM-4 102d is associated with the left ear and the controller unit 104 can identify that the user prefers to communicate using the SIM-4 102d. Accordingly, the controller unit 104 selects the SIM-4 102d for establishing the radio communication.

Figure 15:
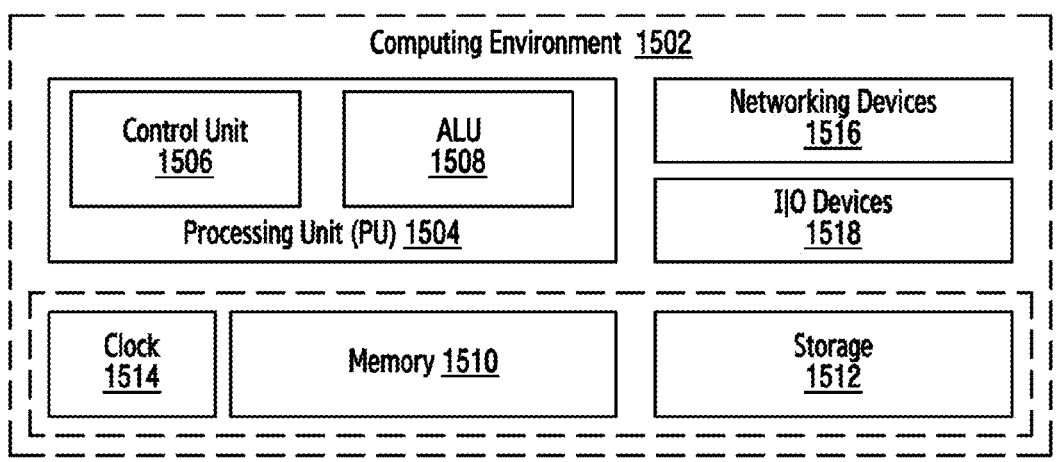
FIG. 15 depicts a computing environment implementing the system and method of selection of a SIM from a plurality of SIMs in the electronic device according to various embodiments of the present disclosure.

FIG. 15 depicts a computing environment implementing the method of selection of SIM 102 in the electronic device 100 including a plurality of SIMs, in accordance with various embodiments of the present disclosure.

Referring to FIG. 15, the computing environment 1502 comprises at least one processing unit 1504 that is equipped with a control unit 1506 and an arithmetic logic unit (ALU) 1508, a memory 1510, a storage unit 1512, a clock chip 1514, plurality of networking devices 1516, and a plurality input/output (I/O) devices 1518. The processing unit 1504 is responsible for processing the instructions of the algorithm. The processing unit 1504 receives commands from the control unit 1506 in order to perform its processing. Further, any logical and arithmetic operations involved in the execution of the instructions are computed with the help of the ALU 1508.

The overall computing environment 1502 can be composed of multiple homogeneous or heterogeneous cores, multiple central processing units (CPUs) of different kinds, special media, and other accelerators. The processing unit 1504 is responsible for processing the instructions of the algorithm. The processing unit 1504 receives commands from the control unit 1506 in order to perform its processing. Any logical and arithmetic operations involved in the execution of the instructions are computed with the help of the ALU 1508. The plurality of processing units may be located on a single chip or over multiple chips.

The algorithm comprising instructions and codes required for the implementation are stored in either the memory unit 1510 or the storage 1512 or both. At the time of execution, the instructions may be fetched from the corresponding memory 1510 or storage 1512, and executed by the processing unit 1504. The processing unit 1504 synchronizes the operations and executes the instructions based on the timing signals generated by the clock chip 1514. The embodiments disclosed herein can be implemented through at least one software program running on at least one hardware device and performing network management functions to control the elements. The elements shown in the FIGS. 1 to 15 include various units, blocks, modules, or operations described in relation with methods, processes, algorithms, or systems of the present disclosure, which can be implemented using any general purpose processor and any combination of programming language, application, and embedded processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device including a plurality of subscriber identification modules (SIMs) for wireless communication, the electronic device comprising:
   at least one sensor, and
   a controller configured to:
      detect that the electronic device or an ear piece connected to the electronic device is located within a predetermined distance from an ear of a user of the electronic device, through the at least one sensor; and
      perform the wireless communication using a SIM selected from among the plurality of SIMs, based on whether the ear is a right ear or a left ear of the user.

2. The electronic device of claim 1,
   wherein the controller is further configured to send an outgoing call to establish the wireless communication with an identifier by using the selected SIM, and
   wherein the identifier comprises a last dialed identifier.

3. The electronic device of claim 1, wherein the controller is further configured to:
   detect a SIM, from among the plurality of SIMs, corresponding to an incoming call;
   determine whether the selected SIM and the detected SIM are different; and
   switch and answer the incoming call to establish the wireless communication by using the selected SIM in response to determining that the selected SIM and the detected SIM are different.

4. The electronic device of claim 3,
   wherein the controller is further configured to:
      display an alert message on the electronic device and initiate a timer associated with the alert message in response to determining that the selected SIM and the detected SIM are different; and
      switch and answer the incoming call to establish the wireless communication by using the selected SIM in response to receiving an input data from the user prior to the timer expiring, and
   wherein the timer derives the input data from the user.

5. The electronic device of claim 4,
   wherein the input data comprises an information associated with a movement of the electronic device, and
   wherein the movement of the electronic device comprises a curved movement associated with a direction of the electronic device.

6. The electronic device of claim 1, wherein the controller is further configured to:
   detect a SIM, from among the plurality of SIMs, corresponding to an incoming call;
   determine whether the selected SIM and the detected SIM are different; and
   send a notification message to a caller of the incoming call in response to determining that the selected SIM and the detected SIM are different, wherein the notification message comprises an identifier associated with the selected SIM.

7. The electronic device of claim 6, wherein the controller is further configured to:
   display an alert message on the electronic device and initiate a timer associated with the alert message in response to determining that the selected SIM and the detected SIM are different; and
   send the notification message to the caller of the incoming call after the timer expires,
   wherein the timer derives the input data from the user.

8. The electronic device of claim 1, wherein the controller is further configured to:
   determine whether the ear piece is connected to the electronic device; and
   in response to determining that the ear piece is disconnected to the electronic device, perform the wireless communication using a SIM selected from among the plurality of SIMs, based on the ear located within the predetermined distance from the electronic device.

9. The electronic device of claim 1, wherein the controller is further configured to:
   determine whether the ear piece is connected to the electronic device; and
   in response to determining that the ear piece is connected to the electronic device, perform the wireless communication using a SIM selected from among the plurality of SIMs, based on the ear wearing the ear piece connected to the electronic device.

10. An electronic device including a plurality of subscriber identification modules (SIMs) for wireless communication, the electronic device comprising:
    a controller configured to:
       detect a movement of the electronic device in response to an occurrence of an event;
       determine a direction of the movement of the electronic device based on a sensor signal related to the detected movement;
       perform the wireless communication using a SIM selected from among the plurality of SIMs, based on whether an ear of a user of the electronic device corresponding to the determined direction of the movement is a right ear or a left ear of the user.

11. The electronic device of claim 10,
    wherein the controller is further configured to send an outgoing call to establish the wireless communication with an identifier by using the selected SIM, and
    wherein the identifier comprises a last dialed identifier.

12. The electronic device of claim 10, wherein the controller is further configured to dynamically change a configuration of the SIM corresponding to the ear.

13. A method of an electronic device including a plurality of subscriber identification modules (SIMs) for wireless communication, the method comprising:
    detecting that the electronic device or an ear piece connected to the electronic device is located within a predetermined distance from an ear of a user of the electronic device, through at least one sensor; and
    performing the wireless communication using a SIM selected from among the plurality of SIMs, based on whether the ear is a right ear or a left ear of the user.

14. The method of claim 13, wherein the performing of the wireless communication comprises:
    sending an outgoing call to establish the wireless communication with an identifier by using the selected SIM,
    wherein the identifier comprises a last dialed identifier.

15. The method of claim 13, further comprising:
    detecting a SIM, from among the plurality of SIMs, corresponding to an incoming call;
    determining whether the selected SIM and the detected SIM are different; and
    switching and answering the incoming call to establish the wireless communication by using the selected SIM in response to determining that the selected SIM and the detected SIM are different.

16. The method of claim 15, wherein the switching and answering the incoming call comprises:
    displaying an alert message on the electronic device and initiating a timer associated with the alert message in response to determining that the selected SIM and the detected SIM are different; and
    switching and answering the incoming call to establish the wireless communication by using the selected SIM in response to receiving an input data from the user prior to the timer expiring,
    wherein the timer derives the input data from the user,
    wherein the input data comprises an information associated with a movement of the electronic device, and
    wherein the movement of the electronic device comprises a curved movement associated with a direction of the electronic device.

17. The method of claim 13, further comprising:
    detecting a SIM, from among the plurality of SIMs, corresponding to an incoming call;
    determining whether the selected SIM and the detected SIM are different; and
    sending a notification message to a caller of the incoming call in response to determining that the selected SIM and the detected SIM are different,
    wherein the notification message comprises an identifier associated with the selected SIM,
    wherein the sending of the notification message to the caller of the incoming call comprises displaying an alert message on the electronic device and initiating a timer associated with the alert message in response to determining that the selected SIM and the detected SIM are different and sending the notification message to the caller of the incoming call after the timer expires, and
    wherein the timer derives the input data from the user.

18. The method of claim 13, wherein the performing the wireless communication comprises:
    determining whether the ear piece is connected to the electronic device; and
    in response to determining that the ear piece is disconnected to the electronic device, performing the wireless communication using the SIM selected from among the plurality of SIMs, based on the ear located within a predetermined distance from the electronic device.

19. The method of claim 13, wherein the performing of the wireless communication comprises:
    determining whether the ear piece is connected to the electronic device; and
    in response to determining that the ear piece is connected to the electronic device, performing the wireless communication using the SIM selected from among the plurality of SIMs, based on the ear wearing an ear piece connected to the electronic device.

* * * * *